United States Patent
Kobayashi et al.

(10) Patent No.: US 11,702,492 B2
(45) Date of Patent: Jul. 18, 2023

(54) METHACRYLIC RESIN COMPOSITION AND MOLDED ARTICLE

(71) Applicant: ASAHI KASEI KABUSHIKI KAISHA, Tokyo (JP)

(72) Inventors: Nobuhiro Kobayashi, Tokyo (JP); Fumiki Murakami, Tokyo (JP)

(73) Assignee: ASAHI KASEI KABUSHIKI KAISHA, Tokyo (JP)

(*) Notice: Subject to any disclaimer, the term of this patent is extended or adjusted under 35 U.S.C. 154(b) by 316 days.

(21) Appl. No.: 17/052,905

(22) PCT Filed: May 10, 2019

(86) PCT No.: PCT/JP2019/018785
§ 371 (c)(1),
(2) Date: Nov. 4, 2020

(87) PCT Pub. No.: WO2019/221031
PCT Pub. Date: Nov. 21, 2019

(65) Prior Publication Data
US 2021/0238326 A1    Aug. 5, 2021

(30) Foreign Application Priority Data
May 18, 2018   (JP) .................................. 2018-096368

(51) Int. Cl.
| | | |
|---|---|---|
| C08F 220/10 | (2006.01) | |
| C08F 220/08 | (2006.01) | |
| C08K 5/07 | (2006.01) | |
| C08F 220/06 | (2006.01) | |
| B29C 45/00 | (2006.01) | |
| C08K 5/3415 | (2006.01) | |
| B29K 33/00 | (2006.01) | |

(52) U.S. Cl.
CPC ........ *C08F 220/06* (2013.01); *B29C 45/0001* (2013.01); *C08K 5/07* (2013.01); *C08K 5/3415* (2013.01); *B29K 2033/12* (2013.01)

(58) Field of Classification Search
CPC .... C08F 220/06; C08F 220/14; C08F 220/10; C08L 33/10; C08K 5/07; C08K 5/3415
See application file for complete search history.

(56) References Cited

U.S. PATENT DOCUMENTS

| | | |
|---|---|---|
| 2010/0272971 A1 | 10/2010 | Miyai et al. |
| 2013/0072651 A1 | 3/2013 | Yonemura et al. |
| 2015/0299360 A1 | 10/2015 | Murakami |
| 2017/0168390 A1 | 6/2017 | Hsu et al. |
| 2018/0305538 A1 | 10/2018 | Murakami et al. |

FOREIGN PATENT DOCUMENTS

| | | |
|---|---|---|
| CN | 102659978 A | 9/2012 |
| CN | 102906130 A | 1/2013 |
| CN | 104736373 A | 6/2015 |
| CN | 107540779 A | 1/2018 |
| EP | 2910397 A1 | 8/2015 |
| JP | 62-89756 A | 4/1987 |
| JP | 10-168058 A | 6/1998 |
| JP | 2007-119730 A | 5/2007 |
| JP | 2009175244 A * | 8/2009 |
| JP | 2014-24361 A | 2/2014 |
| JP | 2015-183023 A | 10/2015 |
| JP | 2016-79194 A | 5/2016 |
| JP | 2016-169282 A | 9/2016 |
| JP | 2016-210963 A | 12/2016 |
| JP | 2017-179354 A | 10/2017 |
| JP | 2018-162406 A | 10/2018 |
| WO | WO 2009/084663 A1 | 7/2009 |
| WO | WO 2017/086275 A1 | 5/2017 |

OTHER PUBLICATIONS

A machine translation into English of Makino et al; JP 2009-175244 A (Year: 2009).*
International Preliminary Report on Patenability and Written Opinion dated Dec. 3, 2020, in PCT/JP2019/018785 (Forms PCT/IB/326, PCT/IB/373, PCT/ISA/237.
European Search Report for European Application No. 19802632.0, dated Jun. 21, 2021.
International Search Report, issued in PCT/JP2019/018785, PCT/ISA/210, dated Aug. 6, 2019.
Written Opinion of the International Searching Authority, issued in PCT/JP2019/018785, PCT/ISA/237, dated Aug. 6, 2019.

* cited by examiner

*Primary Examiner* — Karuna P Reddy
(74) *Attorney, Agent, or Firm* — Birch, Stewart, Kolasch & Birch, LLP

(57) ABSTRACT

The present invention provides a methacrylic resin composition comprising
100 parts by mass of a methacrylic resin comprising 50 to 97% by mass of a methacrylic acid ester monomer unit (A), 3 to 30% by mass of a structural unit (B) having a ring structure in the backbone, and 0 to 20% by mass of an additional vinyl monomer unit (C) copolymerizable with a methacrylic acid ester monomer, and
0.001 to 0.2 parts by mass of a compound (D) having a predetermined structure,
the methacrylic resin composition satisfying the following conditions (I) and (II):
(I): a weight-average molecular weight of the methacrylic resin composition as measured by gel permeation chromatography (GPC) is 65,000 to 300,000, and
(II): a mass ratio between the component (D) and the structural unit (B) having a ring structure in the backbone is $25 \leq (B)/(D) \leq 1000$.

12 Claims, No Drawings

METHACRYLIC RESIN COMPOSITION AND MOLDED ARTICLE

TECHNICAL FIELD

The present invention relates to a methacrylic resin composition and a molded article.

BACKGROUND ART

Methacrylic resins typified by polymethyl methacrylate (PMMA) have high transparency and as such, have heretofore been used in a wide range of fields such as optical materials, parts for vehicles, building materials, lenses, household goods, office automation equipment, and lighting equipment. Among others, in the field of optical members such as light guide panels or light guides typified by thick lenses, the methacrylic resins are often used because of having ease of molding processing, which is a feature of a thermoplastic resin, and particularly excellent transparency among the thermoplastic resins.

In recent years, LED has been a mainstream as a light source for use in combination with the optical members. Particularly, in light guides, LED is suitably used because the straight line motion of light beam emitted from the light source is required. The reason why the straight line motion is required is for reducing light leakage from the light entrance-side end face of a light guide and improving energy efficiency.

Closer proximity between the light-emitting face of LED and the light entrance-side end face of a light guide is more preferred for preventing light leakage from the light entrance-side end face of the light guide. On the other hand, such closer proximity is limited from the viewpoint of the heat resistance of methacrylic resins against the heat generation of LED. In recent years, the number of optical members designed using high-power LED, specifically, LED having a power of 1 W or higher, has increased with growing demand for the design of long paths or improvement in brightness of light guides. However, the high-power LED generates heat in an amount larger than that of LED having a usual power and therefore, unfortunately, makes the closer proximity between the light-emitting face and the light entrance-side end face more difficult.

As mentioned above, light guides, in particular, light guides for high-power LED, tend to be placed under higher temperature conditions than ever.

In light of the situation mentioned above, polycarbonate resins may be used as materials for optical members such as light guides from the viewpoint of heat resistance.

However, in the case of using polycarbonate resins, particularly, for outdoor purposes, the polycarbonate resins must be blended with a larger amount of an ultraviolet absorber due to their poorer weather resistance than those of methacrylic resins. An insufficient amount of the ultraviolet absorber blended causes yellowing, disadvantageously reducing the functions of optical members.

As described above, the weather resistance of polycarbonate resins is improved by blending with an ultraviolet absorber, whereas the blending with an ultraviolet absorber tends to incur reduction in light transmittance. Unfortunately, the resulting optical members cannot meet the demand for the design of long paths or improvement in brightness mentioned above.

For purposes, such as members for vehicles, which are not required to have a high level of transparency, i.e., high long-path transmittance, a technique using a methacrylic copolymer resin comprising a methacrylic acid monomer unit and a monomer unit having a cyclic structure has been proposed (see, for example, Patent Literature 1).

However, the methacrylic copolymer resin disclosed in Patent Literature 1 does not have sufficient molding processability and is thus, unfortunately, not suitable for the production of fine or thine optical members such as light guides.

A technique of improving long-path transmittance through a resin containing a methacrylic acid ester monomer, a maleimide monomer and a styrene monomer is further disclosed (see, for example, Patent Literature 2).

Although the technique disclosed in Patent Literature 2 drastically improves the long-path transmittance of light guides, a problem thereof is the need of further improvement from the viewpoint of long-term hue stability and improvement in whiteness index at a long path.

CITATION LIST

Patent Literature

Patent Literature 1: Japanese Patent Laid-Open No. 2014-024361

Patent Literature 2: Japanese Patent Laid-Open No. 2016-210963

SUMMARY OF INVENTION

Technical Problem

As mentioned above, there is a demand for resin materials that have practically sufficient optical characteristics and achieve well-balanced heat resistance, thermal stability, appearance, weather resistance, hue, and molding processability. In addition, the number of purposes, such as light guides or lenses, which are required to have high transparency has increased. However, the previously proposed resin materials mentioned above are still insufficient, and a higher level of characteristics has been required.

Accordingly, an object of the present invention is to provide a methacrylic resin composition excellent in optical characteristics, heat resistance, thermal stability, appearance, weather resistance, hue, and molding processability, and a molded article thereof.

Solution to Problem

The present inventors have conducted diligent studies to solve the problems of the conventional techniques mentioned above, and consequently completed the present invention.

Specifically, the present invention is as follows.

[1]

A methacrylic resin composition comprising 100 parts by mass of a methacrylic resin comprising 50 to 97% by mass of a methacrylic acid ester monomer unit (A), 3 to 30% by mass of a structural unit (B) having a ring structure in the principal chain, and 0 to 20% by mass of an additional vinyl monomer unit (C) copolymerizable with a methacrylic acid ester monomer, and 0.001 to 0.2 parts by mass of a compound (D) represented by the following general formula (1) or (2), the methacrylic resin composition satisfying the following conditions (I) and (II):

(I): a weight-average molecular weight of the methacrylic resin composition measured by gel permeation chromatography (GPC) is 65,000 to 300,000, and (II): a mass ratio between the component (D) and the structural unit (B) having a ring structure in the principal chain is $25 \leq (B)/(D) \leq 1000$

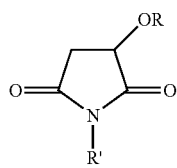

(1)

wherein R represents a hydrogen atom, an aliphatic hydrocarbon group having 1 to 12 carbon atoms or an aromatic hydrocarbon group, wherein each carbon atom optionally has a sulfur atom, a nitrogen atom, an oxygen atom, or a phosphorus atom, and R' represents an aliphatic hydrocarbon group having 1 to 12 carbon atoms or an aromatic hydrocarbon group having 6 to 18 carbon atoms, wherein each carbon atom optionally has a sulfur atom, a nitrogen atom, an oxygen atom, or a phosphorus atom,

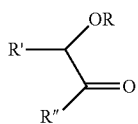

(2)

wherein R, R', and R" each independently represent a hydrogen atom, an aliphatic hydrocarbon group having 1 to 12 carbon atoms or an aromatic hydrocarbon group, wherein each carbon atom optionally has a sulfur atom, a nitrogen atom, an oxygen atom, or a phosphorus atom, and R' and R" are optionally bonded to each other.

[2]

The methacrylic resin composition according to [1], wherein the component (B) comprises at least one structural unit selected from the group consisting of a maleimide structural unit (B-1), a glutaric anhydride structural unit (B-2), a glutarimide structural unit (B-3), a lactone ring structural unit (B-4), and an acid anhydride structural unit (B-5).

[3]

A molded article of a methacrylic resin composition according to [1] or [2].

[4]

The molded article according to [3], wherein the molded article is an optical component.

[5]

The molded article according to [3], wherein the molded article is a member for vehicles.

[6]

The molded article according to [5], wherein a thickness is 0.03 to 3 mm.

Advantageous Effects of Invention

The present invention can provide a methacrylic resin composition that has practically sufficient optical characteristics and is excellent in heat resistance, thermal stability, appearance, weather resistance, hue, and molding processability, and a molded article comprising the same.

DESCRIPTION OF EMBODIMENTS

Hereinafter, a mode for carrying out the present invention (hereinafter, referred to as the "present embodiment") will be described in detail. However, the present invention is not limited by the description given below, and various changes or modifications can be made therein without departing from the spirit of the present invention.

In the following description, each constituent unit constituting a polymer of a methacrylic resin contained in the methacrylic resin composition of the present embodiment is referred to as a "XX monomer unit", and/or a "XX structural unit" comprising a plurality of the "XX monomer units".

A material constituting the "XX monomer unit" is also simply referred to as a "XX monomer" by omitting the term "unit".

[Methacrylic Resin Composition]

The methacrylic resin composition of the present embodiment comprises 100 parts by mass of a methacrylic resin comprising 50 to 97% by mass of a methacrylic acid ester monomer unit (A), 3 to 30% by mass of a structural unit (B) having a ring structure in the backbone, and 0 to 20% by mass of an additional vinyl monomer unit (C) copolymerizable with a methacrylic acid ester monomer, and 0.001 to 0.2 parts by mass of a compound (D) represented by the general formula (1) or (2) given below, the methacrylic resin composition satisfying the following conditions (I) and (II):

(I): a weight-average molecular weight of the methacrylic resin composition as measured by gel permeation chromatography (GPC) is 65,000 to 300,000, and (II): a mass ratio between the component (D) and the structural unit (B) having a ring structure in the backbone is $25 \leq (B)/(D) \leq 1000$.

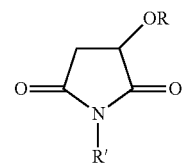

(1)

In the formula (1), R represents a hydrogen atom, an aliphatic hydrocarbon group having 1 to 12 carbon atoms or an aromatic hydrocarbon group. Each carbon atom optionally has a sulfur atom, a nitrogen atom, an oxygen atom, or a phosphorus atom.

In the formula (1), R' represents an aliphatic hydrocarbon group having 1 to 12 carbon atoms or an aromatic hydrocarbon group having 6 to 18 carbon atoms. Each carbon atom optionally has a sulfur atom, a nitrogen atom, an oxygen atom, or a phosphorus atom.

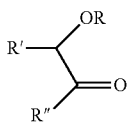

(2)

In the formula (2), R, R', and R" each independently represent a hydrogen atom, an aliphatic hydrocarbon group having 1 to 12 carbon atoms or an aromatic hydrocarbon group.

Each carbon atom optionally has a sulfur atom, a nitrogen atom, an oxygen atom, or a phosphorus atom.

In the formula (2), R' and R" are optionally bonded to each other.

(Methacrylic Resin)

The methacrylic resin for use in the methacrylic resin composition of the present embodiment is a methacrylic resin comprising 50 to 97% by mass of a methacrylic acid ester monomer unit (A), 3 to 30% by mass of a structural unit (B) having a ring structure in the backbone, and 0 to 20% by mass of an additional vinyl monomer unit (C) copolymerizable with a methacrylic acid ester monomer.

<Methacrylic Acid Ester Monomer Unit (A)>

A monomer unit represented by the following general formula (i) is suitably used as the methacrylic acid ester monomer unit (A) (hereinafter, also referred to as the monomer unit (A)) constituting the methacrylic resin.

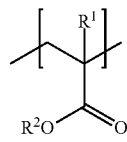

(i)

In the general formula (i), $R^1$ represents a substituted or unsubstituted alkyl group having 1 to 6 carbon atoms, and the alkyl group is optionally substituted with a hydroxy group. $R^1$ is preferably a methyl group.

In the general formula (i), $R^2$ represents a group having 1 to 12 carbon atoms and is preferably a hydrocarbon group having 1 to 12 carbon atoms. The hydrocarbon group is optionally substituted with a hydroxy group. $R^2$ is preferably a group having 1 to 8 carbon atoms.

The monomer of the methacrylic acid ester monomer unit (A) represented by the general formula (i) is not particularly limited, and a methacrylic acid ester monomer represented by the following general formula (ii) is preferably used.

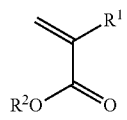

(ii)

In the general formula (ii), $R^1$ represents a substituted or unsubstituted alkyl group having 1 to 6 carbon atoms. The alkyl group is optionally substituted with a hydroxy group. $R^1$ is preferably a methyl group.

In the general formula (ii), $R^2$ represents a group having 1 to 12 carbon atoms and is preferably a hydrocarbon group having 1 to 12 carbon atoms. The hydrocarbon group is optionally substituted with a hydroxy group. $R^2$ is preferably a group having 1 to 8 carbon atoms.

Examples of the methacrylic acid ester monomer forming the methacrylic acid ester monomer unit (A) include, but are not limited to, butyl methacrylate, ethyl methacrylate, methyl methacrylate, propyl methacrylate, isopropyl methacrylate, cyclohexyl methacrylate, phenyl methacrylate, (2-ethylhexyl) methacrylate, (t-butylcyclohexyl) methacrylate, benzyl methacrylate, and (2,2,2-trifluoroethyl) methacrylate.

Methyl methacrylate, ethyl methacrylate, cyclohexyl methacrylate, phenyl methacrylate, and benzyl methacrylate are preferred from the viewpoint of heat resistance, handleability, and optical characteristics, and methyl methacrylate is preferred from the viewpoint of easy availability, etc.

Only one of these methacrylic acid ester monomers may be used alone, or two or more thereof may be used in combination.

The methacrylic acid ester monomer unit (A) of the methacrylic resin needs to be contained in the range of 50% by mass or more and 97% by mass or less in the methacrylic resin from the viewpoint of maintaining high transparency, and from the viewpoint of sufficiently imparting heat resistance to the methacrylic resin composition of the present embodiment and the molded article of the present embodiment through the structural unit (B) having a ring structure in the backbone mentioned later, and imparting favorable hue thereto. The content thereof is preferably 55% by mass or more, more preferably 60% by mass or more, further preferably 70% by mass or more, still further preferably 80% by mass or more, even further preferably 90% by mass or more.

Particularly, in the case of imparting high heat resistance, the content is preferably 96% by mass or less, more preferably 95% by mass or less.

The amount of a residual methacrylic acid ester monomer is preferably 1% by mass or less, more preferably 0.7% by mass or less, further preferably 0.5% by mass or less, still further preferably 0.3% by mass or less, even further preferably 0.2% by mass or less, in the methacrylic resin composition from the viewpoint of heat resistance, the suppression of silver generation at the time of molding, and hue.

<Structural Unit (B) Having Ring Structure in Backbone>

The structural unit (B) having a ring structure in the backbone (hereinafter, also referred to as the structural unit (B)), constituting the methacrylic resin preferably comprises at least one structural unit selected from the group consisting of a maleimide structural unit (B-1), a glutaric anhydride structural unit (B-2), a glutarimide structural unit (B-3), a lactone ring structural unit (B-4), and an acid anhydride structural unit (B-5) from the viewpoint of heat resistance.

Only one of these structural units (B) having a ring structure in the backbone may be used singly, or two or more thereof may be combined.

[Maleimide Structural Unit (B-1)]

A structural unit represented by the following general formula (iii) is suitably used as the maleimide structural unit (B-1) constituting the methacrylic resin.

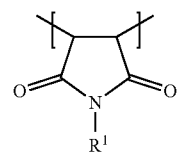

(iii)

In the general formula (iii), $R^1$ represents any member selected from the group consisting of a hydrogen atom, an alkyl group having 1 to 12 carbon atoms, a cycloalkyl group having 1 to 12 carbon atoms, an alkoxy group having 1 to 12 carbon atoms, and an aryl group having 6 to 12 carbon atoms. The alkyl group, the alkoxy group, the cycloalkyl group, or the aryl group optionally has a substituent on a carbon atom.

Examples of the monomer for forming the maleimide structural unit (B-1) include, but are not limited to: maleimide; N-alkyl group-substituted maleimides such as N-methylmaleimide, N-ethylmaleimide, and N-cyclohexylmaleimide; and N-aryl group-substituted maleimides such as N-phenylmaleimide, N-methylphenylmaleimide, N-ethylphenylmaleimide, N-butylphenylmaleimide, N-dimethylphenylmaleimide, N-hydroxyphenylmaleimide, N-methoxyphenylmaleimide, N-(o-chlorophenyl)maleimide, N-(m-chlorophenyl)maleimide, and N-(p-chlorophenyl)maleimide.

The monomer for forming the maleimide structural unit (B-1) is preferably N-cyclohexylmaleimide, N-phenylmaleimide, N-methylphenylmaleimide, N-(o-chlorophenyl)maleimide, N-(m-chlorophenyl)maleimide, or N-(p-chlorophenyl)maleimide from the viewpoint of imparting heat resistance and imparting moist heat resistance and is more preferably N-cyclohexylmaleimide or N-phenylmaleimide, further preferably N-phenylmaleimide, from the viewpoint of easy availability and imparting heat resistance Only one of the maleimide structural units (B-1) mentioned above may be used singly, or two or more thereof may be used in combinations.

[Glutaric Anhydride Structural Unit (B-2)]

The glutaric anhydride structural unit (B-2) constituting the methacrylic resin is formed by polymerizing a predetermined monomer with the methacrylic resin, followed by cyclization.

A structural unit represented by the following general formula (iv) is suitably used as the glutaric anhydride structural unit (B-2).

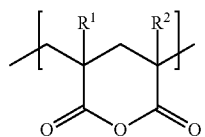

(iv)

In the general formula (iv), $R^1$ and $R^2$ each independently represent a hydrogen atom or a substituted or unsubstituted alkyl group having 1 to 6 carbon atoms. The alkyl group is optionally substituted with a hydroxy group.

Only one of the glutaric anhydride structural units (B-2) mentioned above may be used singly, or two or more thereof may be used in combinations.

Examples of the method for forming the glutaric anhydride structural unit (B-2) include, but are not particularly limited to, a method of copolymerizing a monomer having a structure represented by the following general formula (v) with a monomer of the methacrylic acid ester monomer unit (A) mentioned above, followed by cyclization by heating treatment in the presence or absence of a catalyst.

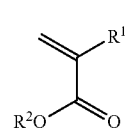

(v)

In the general formula (v), $R^1$ represents a hydrogen atom or a substituted or unsubstituted alkyl group having 1 to 6 carbon atoms. The alkyl group is optionally substituted with a hydroxy group.

In the general formula (v), $R^2$ represents a hydrogen atom or t-butyl.

The monomer having a structure represented by the general formula (v) may remain unreacted in the methacrylic resin as long as the advantageous effects of the present invention can be exerted.

[Glutarimide Structural Unit (B-3)]

The glutarimide structural unit (B-3) constituting the methacrylic resin can be formed after polymerization for the methacrylic resin.

A structural unit represented by the following general formula (vi) is suitably used as the glutarimide structural unit (B-3).

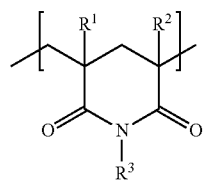

(vi)

In the general formula (vi), $R^1$ and $R^2$ each independently represent a hydrogen atom or a substituted or unsubstituted alkyl group having 1 to 6 carbon atoms. The alkyl group is optionally substituted with a hydroxy group.

In the general formula (vi), $R^3$ represents any member selected from the group consisting of a hydrogen atom, a substituted or unsubstituted alkyl group having 1 to 6 carbon atoms, and a substituted or unsubstituted aryl group having 6 to 18 carbon atoms.

Particularly preferably, all of $R^1$, $R^2$, and $R^3$ are methyl groups.

Only one of the glutarimide structural units (B-3) mentioned above may be used singly, or two or more thereof may be used in combinations.

The content of the glutarimide structural unit (B-3) is not particularly limited and can be appropriately determined from the viewpoint of heat resistance, molding processability, optical characteristics, etc.

The content of the glutarimide structural unit (B-3) is preferably 1 to 50% by mass, more preferably 3 to 30% by mass, further preferably 3 to 20% by mass, per 100% by mass of the methacrylic resin.

The content of the glutarimide structural unit (B-3) can be calculated by, for example, a method described in the paragraphs [0136] to [0137] of International Publication No. WO 2015/098096.

The acid value of the methacrylic resin comprising the glutarimide structural unit (B-3) is preferably 0.50 mmol/g or less, more preferably 0.45 mmol/g or less, from the viewpoint of the balance among the physical properties, molding processability, color, etc. of the methacrylic resin.

The acid value can be calculated by, for example, a titration method described in Japanese Patent Laid-Open No. 2005-23272.

The glutarimide structural unit (B-3) can be obtained by a method known in the art such as: a method of copolymerizing methacrylic acid ester and/or methacrylic acid, followed by reaction with ammonia, amine, urea or unsubstituted urea at a high temperature; a method of reacting a methyl methacrylate-methacrylic acid-styrene copolymer or a methyl methacrylate-styrene copolymer with ammonia or amine; or a method of reacting polymethacrylic anhydride with ammonia or amine.

Specific examples thereof include a method described in U.S. Pat. No. 4,246,374 of R. M. Kopchik.

The glutarimide structural unit (B-3) can also be formed by a method of copolymerizing an acid anhydride such as maleic anhydride, half ester of the acid anhydride and a linear or branched alcohol having 1 to 20 carbon atoms, or α,β-ethylenic unsaturated carboxylic acid with the methacrylic acid ester monomer, followed by imidization.

Other preferred examples of the method for forming the glutarimide structural unit (B-3) include a method of polymerizing (meth)acrylic acid ester, and optionally, an aromatic vinyl monomer or other vinyl monomers, followed by imidization reaction to obtain the methacrylic resin comprising the glutarimide structural unit (B-3).

In the step of imidization reaction, an imidizing agent is preferably used, and a ring closing promoter may be added, if necessary.

In this context, ammonia or primary amine can be used as the imidizing agent.

For example, methylamine, ethylamine, n-propylamine, or cyclohexylamine can be suitably used as the primary amine.

The method for carrying out the imidization reaction is not particularly limited, and a conventional method known in the art can be used. Examples thereof include a method using an extruder, a horizontal twin-screw reaction apparatus, or a batch-type reaction vessel. The extruder is not particularly limited, and a single-screw extruder, a twin-screw extruder or a multi-screw extruder can be suitably used. More suitably, a tandem reaction extruder in which two twin-screw extruders are arranged in series can be used.

The production of the methacrylic resin comprising the glutarimide structural unit (B-3) may involve an esterification step of performing treatment with an esterifying agent, in addition to the step of imidization reaction.

The esterification step involved therein can convert a carboxyl group contained in the methacrylic resin, produced as a by-product during the imidization step, to an ester group and can adjust the acid value of the methacrylic resin to the desired range.

In this context, the esterifying agent is not particularly limited as long as the advantageous effects of the invention of the present application can be exerted. Dimethyl carbonate or trimethyl acetate can be suitably used. The amount of the esterifying agent used is not particularly limited and is preferably 0 to 12 parts by mass per 100 parts by mass of the methacrylic resin.

Aliphatic tertiary amine such as trimethylamine, triethylamine, or tributylamine may be used as a catalyst in combination with the esterifying agent.

[Lactone Ring Structural Unit (B-4)]

The lactone ring structural unit (B-4) constituting the methacrylic resin can be formed by copolymerizing a predetermined monomer with the methacrylic acid ester monomer, followed by a step of forming a lactone ring.

A structural unit represented by the following general formula (vii) is suitably used as the structural unit (B-4).

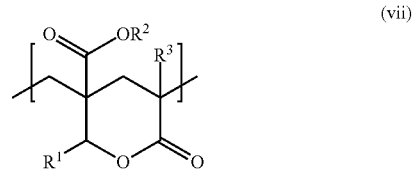

(vii)

In the general formula (vii), $R^1$, $R^2$, and $R^3$ each independently represent a hydrogen atom or an organic group having 1 to 20 carbon atoms. The organic group optionally contains an oxygen atom.

Only one of the lactone ring structural units (B-4) mentioned above may be used singly, or two or more thereof may be used in combinations.

Examples of the method for producing the methacrylic resin containing the lactone ring structural unit (B-4) include, but are not particularly limited to, a method of copolymerizing a monomer having a hydroxy group in a side chain, specifically, a monomer having a structure represented by the following general formula (viii) (methyl 2-(hydroxymethyl)acrylate, etc.) with a monomer having an ester group such as the methacrylic acid ester monomer mentioned above, and then subjecting the obtained copolymer to heating treatment in the presence or absence of a predetermined catalyst to introduce a lactone ring structure to the polymer.

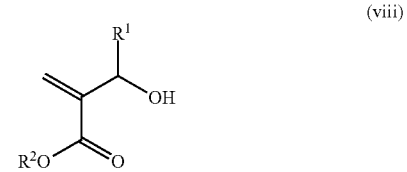

(viii)

In the general formula (viii), $R^1$ represents a hydrogen atom or a substituted or unsubstituted alkyl group having 1 to 6 carbon atoms. The alkyl group is optionally substituted with a hydroxy group.

In the general formula (viii), $R^2$ represents a group having 1 to 12 carbon atoms and is preferably a hydrocarbon group having 1 to 12 carbon atoms. The hydrocarbon group is optionally substituted with a hydroxy group.

Particularly preferably, $R^1$ is a hydrogen atom, and $R^2$ is a methyl group.

The monomer having a structure represented by the general formula (viii) may remain unreacted in the methacrylic resin as long as the advantageous effects of the present invention can be exerted.

[Acid Anhydride Structural Unit (B-5)]

The acid anhydride structural unit (B-5) constituting the methacrylic resin can be formed using, for example, an acid anhydride such as maleic anhydride, half ester of the acid anhydride and a linear or branched alcohol having 1 to 20 carbon atoms, or α,β-ethylenic unsaturated carboxylic acid.

The "structural unit (B) having a ring structure in the backbone" contained in the methacrylic resin mentioned above preferably comprises at least one structural unit selected from the group consisting of the maleimide structural unit (B-1) and the glutarimide structural unit (B-3), more preferably the maleimide structural unit (B-1), from the viewpoint of thermal stability and molding processability.

The maleimide structural unit (B-1) is preferably a N-cyclohexylmaleimide structural unit and/or a N-aryl-substituted maleimide structural unit from the viewpoint of easy availability and is more preferably a N-cyclohexylmaleimide structural unit from the viewpoint of the hue of a molded article.

In the case of using the maleimide structural unit (B-1), the content thereof is preferably less than 50% by mass, more preferably less than 40% by mass, further preferably less than 35% by mass, still further preferably 1 to 30% by mass, even further preferably 2 to 20% by mass, per 100% by mass in total of the methacrylic acid ester monomer unit (A) and the structural unit (B) having a ring structure in the backbone from the viewpoint of heat resistance and thermal stability.

The structural unit (B) having a ring structure in the backbone is contained at 30% by mass or less in the methacrylic resin from the viewpoint of the heat resistance, thermal stability, strength and fluidity of the methacrylic resin composition of the present embodiment.

The content of the structural unit (B) having a ring structure in the backbone in the methacrylic resin is 3% by mass or more, preferably 4% by mass or more, more preferably 5% by mass or more, from the viewpoint of imparting heat resistance and thermal stability to the methacrylic resin composition of the present embodiment.

The content of the structural unit (B) having a ring structure in the backbone in the methacrylic resin is 30% by mass or less, preferably 25% by mass or less, more preferably 20% by mass or less, further preferably 14% by mass or less, still further preferably 10% by mass or less, from the viewpoint of retaining well-balanced strength and fluidity necessary for a molded article.

The content of a residual monomer component derived from the component (B) in the methacrylic resin and the methacrylic resin composition is preferably 0.5% by mass or less, more preferably 0.3% by mass or less, further preferably 0.2% by mass or less, still further preferably 0.15% by mass or less, even further preferably 0.1% by mass or less, per 100% by mass of the methacrylic resin from the viewpoint of favorable yellowness index and transmittance of a molded article.

The amount of the residual monomer is preferably kept low. In the case of minimizing the amount of the residual monomer, productivity may be influenced due to a complicated step, etc. The content of the residual monomer derived from the component (B) is preferably 0.001% by mass or more, more preferably 0.005% by mass or more, further preferably 0.011% by mass or more, still further preferably 0.02% by mass or more, in consideration of hue and productivity.

<Additional Vinyl Monomer Unit (C) Copolymerizable with Methacrylic Acid Ester Monomer>

For the methacrylic resin, an additional vinyl monomer unit is preferably copolymerized from the viewpoint of obtaining a resin having much better weather resistance, fluidity, chemical resistance and thermal stability, etc. and imparting other characteristics thereto.

Examples thereof include an acrylic acid ester monomer unit (C-1) and a vinyl cyanide monomer unit (C-2),

[Acrylic Acid Ester Monomer Unit (C-1)]

The monomer that is used for forming the acrylic acid ester monomer unit (C-1) constituting the methacrylic resin is not particularly limited and is preferably an acrylic acid ester monomer represented by the following general formula (ix).

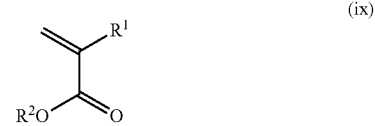

In the general formula (ix), $R^1$ represents a hydrogen atom or an alkoxy group having 1 to 12 carbon atoms, and $R^2$ represents an alkyl group having 1 to 18 carbon atoms, a cycloalkyl group having 1 to 18 carbon atoms, or an aryl group having 1 to 18 carbon atoms.

The monomer for forming the acrylic acid ester monomer unit (C-1) is preferably methyl acrylate, ethyl acrylate, n-propyl acrylate, n-butyl acrylate, sec-butyl acrylate, 2-ethylhexyl acrylate, cyclohexyl acrylate, phenyl acrylate, or the like, more preferably methyl acrylate, ethyl acrylate, or n-butyl acrylate, from the viewpoint of enhancing the weather resistance, heat resistance, fluidity, and thermal stability of the methacrylic resin for the molded article of the present embodiment, and is further preferably methyl acrylate or ethyl acrylate from the viewpoint of easy availability.

Only one of these acrylic acid ester monomer units (C-1) may be used singly, or two or more thereof may be used in combinations.

In the case of using the acrylic acid ester monomer unit (C-1), the content thereof is preferably 5% by mass or less, more preferably 3% by mass or less, per 100% by mass in total of the methacrylic acid ester monomer unit (A) and the structural unit (B) having a ring structure in the backbone from the viewpoint of heat resistance and thermal stability.

[Vinyl Cyanide Monomer Unit (C-2)]

In the methacrylic resin, the additional vinyl monomer unit (C) is preferably a vinyl cyanide monomer unit (C-2) from the viewpoint of being easily obtained and producing a methacrylic resin having much better chemical resistance.

Examples of the monomer that is used for forming the vinyl cyanide monomer unit (C-2) constituting the methacrylic resin include, but are not limited to, acrylonitrile, methacrylonitrile, and vinylidene cyanide. Particularly, acrylonitrile is preferred from the viewpoint of easy availability and the imparting of chemical resistance.

Only one of these vinyl cyanide monomer units (C-2) may be used singly, or two or more thereof may be used in combinations.

In the case of using the vinyl cyanide monomer unit (C-2), the content thereof is preferably 15% by mass or less, more preferably 12% by mass or less, further preferably 10% by mass or less, per 100% by mass in total of the methacrylic acid ester monomer unit (A) and the structural unit (B) having a ring structure in the backbone from the viewpoint of retaining solvent resistance and heat resistance.

[Monomer Unit (C-3) Other than (C-1) and (C-2)]

Examples of the monomer that is used for forming the "additional vinyl monomer unit (C-3) copolymerizable with a methacrylic acid ester monomer", other than (C-1) and (C-2), constituting the methacrylic resin include, but are not limited to: styrene; amides such as acrylamide and methacrylamide; ethylene glycol or oligomers thereof with both terminal hydroxy groups esterified with acrylic acid or methacrylic acid, such as ethylene glycol di(meth)acrylate, diethylene glycol di(meth)acrylate, triethylene glycol di(meth)acrylate, and tetraethylene glycol di(meth)acrylate; alcohols with two hydroxy groups esterified with acrylic acid or methacrylic acid, such as neopentyl glycol di(meth)acrylate and di(meth)acrylate; polyhydric alcohol derivatives esterified with acrylic acid or methacrylic acid, such as trimethylolpropane and pentaerythritol; and polyfunctional monomers such as divinylbenzene.

The monomer that is used for constituting the "additional vinyl monomer unit (C) copolymerizable with a methacrylic acid ester monomer" mentioned above is preferably at least one member selected from the group consisting of methyl acrylate, ethyl acrylate, styrene and acrylonitrile from the viewpoint of easy availability. When the molded article of the present embodiment is an optical component, methyl acrylate is preferred from the viewpoint of retaining transmittance at a long path having a length of 100 mm or larger, and hue.

The content of the additional vinyl monomer unit (C) copolymerizable with a methacrylic acid ester monomer is 0 to 20% by mass, preferably 0 to 18% by mass, more preferably 0 to 15% by mass, per 100% by mass of the methacrylic resin from the viewpoint of achieving the balance among characteristics within a suitable range of the content of the monomer unit formed by a selected monomer according to the monomer, for example, enhancing the effect of imparting heat resistance to the methacrylic resin composition and the molded article of the present embodiment through the structural unit (B) having a ring structure in the backbone mentioned above.

Particularly, in the case of using cross-linkable polyfunctional (meth)acrylate having a plurality of reactive double bonds as the additional vinyl monomer unit (C), the content of the additional vinyl monomer unit (C) is preferably 0.5% by mass or less, more preferably 0.3% by mass or less, further preferably 0.2% by mass or less, from the viewpoint of fluidity.

(Compound (D))

The methacrylic resin composition of the present embodiment comprises 0.001 parts by mass or more and 0.2 parts by mass or less of a compound (D) represented by the following general formula (1) or (2) per 100 parts by mass of the methacrylic resin.

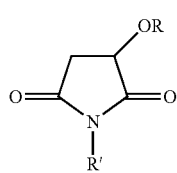

(1)

In the formula (1), R represents a hydrogen atom, an aliphatic hydrocarbon group having 1 to 12 carbon atoms or an aromatic hydrocarbon group. Each carbon atom optionally has a sulfur atom, a nitrogen atom, an oxygen atom, or a phosphorus atom.

In the formula (1), R' represents an aliphatic hydrocarbon group having 1 to 12 carbon atoms or an aromatic hydrocarbon group having 6 to 18 carbon atoms. Each carbon atom optionally has a sulfur atom, a nitrogen atom, an oxygen atom, or a phosphorus atom.

(2)

In the formula (2), R, R', and R" each independently represent a hydrogen atom, an aliphatic hydrocarbon group having 1 to 12 carbon atoms or an aromatic hydrocarbon group.

Each carbon atom optionally has a sulfur atom, a nitrogen atom, an oxygen atom, or a phosphorus atom.

In the formula (2), R' and R" are optionally bonded to each other.

The compound (D) preferably has a succinimide skeleton, more preferably a 3-hydroxysuccinimide skeleton in which R in the formula (1) is a hydrogen atom, from the viewpoint of reducing the degree of change in YI value during long-term retention at the time of molding of the methacrylic resin composition of the present embodiment.

The content of the compound (D) is 0.001 parts by mass or more, preferably 0.005 parts by mass or more, more preferably 0.01 parts by mass or more, further preferably 0.015 parts by mass or more, still further preferably 0.02 parts by mass or more, even further preferably 0.03 parts by mass or more, per 100 parts by mass of the methacrylic resin from the viewpoint of minimizing the degree of change in YI value when the methacrylic resin composition of the present embodiment is repetitively exposed to a high temperature for a long time at the time of molding.

When the molded article of the present embodiment is an optical component, the content of the compound (D) is 0.2 parts by mass or less, preferably 0.15 parts by mass or less, more preferably 0.12 parts by mass or less, further preferably 0.11 parts by mass or less, still further preferably 0.1 parts by mass or less, per 100 parts by mass of the methacrylic resin from the viewpoint of retaining high transmittance at a long path, and high whiteness index.

The compound (D) contained in the given amount suppresses the thermal decomposition of the methacrylic resin composition left in a high-temperature environment, reduces yellowing at a long path when the molded article of the present embodiment is an optical component, and produces the effect of improving transmittance stability.

The mass ratio between the compound (D) and the structural unit (B) having a ring structure in the backbone in the methacrylic resin composition of the present embodiment is in the range of $25 \leq (B)/(D) \leq 1000$ from the viewpoint of obtaining the stability of YI at the time of continuous molding, reduction in yellowing at a long path, and the effect of improving transmittance stability, and from the viewpoint of reduction in silver streaks at the time of molding processing, etc.

The ratio (B)/(D) is preferably 800 or less, more preferably 700 or less, further preferably 600 or less, still further preferably 500 or less, from the viewpoint of reducing the dependence of the degree of yellowing on the thickness in the range of 3 mm to 220 mm of a molded article of the methacrylic resin composition, i.e., the value of change in YI value among thicknesses when the YI values of molded pieces having a predetermined thickness from 3 mm to 220 mm are measured.

The ratio is preferably 30 or more, more preferably 45 or more, further preferably 50 or more, from the viewpoint of the heat resistance of the methacrylic resin composition.

(Characteristics of Methacrylic Resin and Methacrylic Resin Composition)

Hereinafter, the characteristics of the methacrylic resin and the methacrylic resin composition will be described.

<Weight-Average Molecular Weight and Molecular Weight Distribution>

The weight-average molecular weight (Mw) of the methacrylic resin, or the methacrylic resin composition of the present embodiment is 65,000 to 300,000 from the viewpoint of obtaining a methacrylic resin composition having much better mechanical strength, solvent resistance, and fluidity.

When the weight-average molecular weight of the methacrylic resin composition falls within the range described above, the methacrylic resin and the methacrylic resin composition of the present embodiment are excellent in mechanical strength such as Charpy impact strength, and fluidity.

The weight-average molecular weight is 65,000 or higher, preferably 70,000 or higher, more preferably 80,000 or higher, further preferably 100,000 or higher, from the viewpoint of retaining mechanical strength.

The weight-average molecular weight is preferably 250,000 or lower, more preferably 200,000 or lower, further preferably 150,000 or lower, still further preferably 130,000 or lower, even further preferably 120,000 or lower, from the viewpoint of securing fluidity at the time of molding processing, reducing strain at the time of molding, and imparting long-path transmittance.

The molecular weight distribution (weight-average molecular weight (Mw)/number-average molecular weight (Mn)) of the methacrylic resin is preferably 1.5 to 5 from the viewpoint of the balance among fluidity, mechanical strength, and solvent resistance. The molecular weight distribution is more preferably 1.5 to 4.5, further preferably 1.6 to 4, still further preferably 1.6 to 3, even further preferably 1.6 to 2.5.

The weight-average molecular weight (Mw) and the number-average molecular weight (Mn) can be measured by gel permeation chromatography (GPC). Specifically, a calibration curve of weight-average molecular weights vs. elution times is prepared in advance using standard methacrylic resins that have a known weight-average molecular weight, number-average molecular weight, and peak molecular weight in a monodisperse system and are available as reagents, and an analytical gel column that elutes high-molecular-weight components first. Subsequently, the weight-average molecular weight and the number-average molecular weight of a methacrylic resin sample to be measured can be determined from the obtained calibration curve.

Specifically, the weight-average molecular weight and the number-average molecular weight can be measured by a method described in Examples mentioned later.

(Method for Producing Methacrylic Resin)

The method for producing the methacrylic resin is not particularly limited as long as a methacrylic resin that satisfies the requirements of the present embodiment is obtained.

The methacrylic resin can be produced by a bulk polymerization method, a solution polymerization method, a suspension polymerization method, a precipitation polymerization method, or an emulsion polymerization method using the respective monomers for forming the methacrylic acid ester monomer unit (A), the structural unit (B) having a ring structure in the backbone, and optionally, the additional vinyl monomer unit (C) copolymerizable with a methacrylic acid ester monomer mentioned above.

A bulk polymerization method, a solution polymerization method, or a suspension polymerization method is preferably used. A solution polymerization method or a suspension polymerization method is more preferably used. A suspension polymerization method is further preferably used.

The methacrylic resin may be produced in a continuous manner or a batch manner.

In the method for producing the methacrylic resin, the monomers are preferably polymerized by radical polymerization.

In the polymerization reaction for the methacrylic resin, a polymerization initiator may be used.

The polymerization initiator can be any polymerization initiator that is decomposed at a polymerization temperature to generate active radicals, and needs to achieve a necessary rate of polymerization conversion within the range of a retention time. The polymerization initiator is selected so as to satisfy a half-life of 0.6 to 60 minutes, preferably 1 to 30 minutes, at a polymerization temperature. However, even a polymerization initiator having a half-life exceeding 60 minutes at a polymerization temperature can be added in a predetermined amount in one portion or over a time on the order of 10 minutes and thereby used as the polymerization initiator that generates active radicals in an amount suitable for the present embodiment. In this case, in order to achieve the necessary rate of polymerization conversion, the polymerization initiator is selected so as to satisfy a half-life of 60 to 1800 minutes, preferably 260 to 900 minutes, at a polymerization temperature.

The polymerization initiator suitably used can be appropriately selected in light of a polymerization temperature and a polymerization time. For example, a polymerization initiator described in NOF Corp., the document "Organic Peroxides", the 13th edition, technical data from ARKEMA Yoshitomi, Ltd. and Wako Pure Chemical Industries, Ltd., "Azo Polymerization Initiators" can be suitably used. The half-life can be easily determined using a constant, etc. described therein.

In the case of performing radical polymerization, examples of the polymerization initiator can include, but are not limited to, general radical polymerization initiators including: organic peroxides such as di-t-butyl peroxide, lauroyl peroxide, stearyl peroxide, benzoyl peroxide, t-butyl peroxyneodecanoate, t-butyl peroxypivalate, dilauroyl peroxide, dicumyl peroxide, t-butyl peroxy-2-ethylhexanoate, 1,1-bis(t-butylperoxy)-3,3,5-trimethylcyclohexane, 1,1-bis (t-butylperoxy)cyclohexane (e.g., PERHEXA® C), acetyl peroxide, caprylyl peroxide, 2,4-dichlorobenzoyl peroxide, isobutyl peroxide, acetylcyclohexylsulfonyl peroxide, t-butyl peroxypivalate, t-butyl peroxy-2-ethylhexanoate, iso-propyl peroxydicarbonate, iso-butyl peroxydicarbonate, sec-butyl peroxydicarbonate, n-butyl peroxydicarbonate, 2-ethylhexyl peroxydicarbonate, bis(4-t-butylcyclohexyl) peroxydicarbonate, t-amyl peroxy-2-ethylhexanoate, 1,1,3, 3-tetramethylbutyl peroxyethylhexanoate, 1,1,2-trimethylpropyl peroxy-2-ethylhexanoate, 2,5-dimethyl-2,5-di(t-butyl peroxy)hexane (e.g., PERHEXA® 25B), t-butyl peroxyisopropylmonocarbonate, t-amyl peroxyisopropylmonocarbonate, 1,1,3,3-tetramethylbutyl peroxyisopropylmonocarbonate, 1,1,2-trimethylpropyl peroxyisopropylmonocarbonate, 1,1,3,3-tetramethylbutyl peroxyisononanoate, 1,1,2-trimethylpropyl peroxyisononanoate, and t-butyl peroxybenzoate; and azo compounds such as azobisisobutyronitrile, azobisisovaleronitrile, azobisdimethylvaleronitrile, azobiscyclohexanenitrile, 1,1-azobis(1-cyclohexanecarbonitrile), 2,2'-azobis-4-methoxy-2,4-azobisisobutyronitrile, 2,2'-azobis-2,4-dimethylvaleronitrile, 2,2'-azobis-2-methylbutyronitrile, 1,1'-azobis(1-acetoxy-1-phenylethane), dimethyl-2,2'-azobisisobutyrate, and 4,4'-azobis-4-cyanovaleric acid.

The radical polymerization initiator mentioned above may be used as a redox polymerization initiator in combination with an appropriate reducing agent.

One of these polymerization initiators can be used singly, or two or more thereof can be used in combinations.

The polymerization initiator can be added in an amount necessary for obtaining the desired rate of polymerization in a polymerization reactor.

In the polymerization reaction, the degree of polymerization can be enhanced by increasing the amount of the polymerization initiator supplied. However, use of the polymerization initiator in a large amount tends to decrease the molecular weight of the whole methacrylic resin and increases the amount of heat generated at the time of polymerization, which may therefore reduce polymerization stability due to overheat.

The polymerization initiator is preferably used in the range of 0 to 1 parts by mass, more preferably 0.001 to 0.8 parts by mass, further preferably 0.01 to 0.5 parts by mass, per 100 parts by mass in total of all the monomers used from the viewpoint of easily obtaining the desired molecular weight and securing polymerization stability.

The amount of the polymerization initiator added can be appropriately selected in consideration of a temperature at which polymerization is performed, and also the half-life of the polymerization initiator.

In the polymerization reaction for the methacrylic resin, a chain transfer agent, an iniferter, or the like can be optionally used as a molecular weight adjuster.

In the process of producing the methacrylic resin, the molecular weight of the methacrylic resin to be produced can be controlled without impairing the advantageous effects of the present invention.

Examples of the chain transfer agent and the iniferter include, but are not limited to: chain transfer agents such as alkylmercaptans, dimethylacetamide, dimethylformamide, and triethylamine; and iniferters such as dithiocarbamates, triphenylmethylazobenzene, and tetraphenylethane derivatives. Use of these agents can control the molecular weight of the methacrylic resin. The molecular weight of the methacrylic resin can be controlled by adjusting the amount of the chain transfer agent or the iniferter added.

In the case of using such a chain transfer agent or an iniferter, alkylmercaptans are suitably used from the viewpoint of handleability or stability. Examples thereof include, but are not limited to, n-butylmercaptan, n-octylmercaptan, n-dodecylmercaptan, t-dodecylmercaptan, n-tetradecylmercaptan, n-octadecylmercaptan, 2-ethylhexyl thioglycolate, ethylene glycol dithioglycolate, trimethylolpropane tris (thioglycolate), and pentaerythritol tetrakis(thioglycolate).

These molecular weight adjusters can be appropriately added according to the molecular weight of the methacrylic resin of interest and are generally used in the range of 0.001 to 3 parts by mass per 100 parts by mass in total of all the monomers used.

Other examples of the method for controlling the molecular weight of the methacrylic resin include a method of changing a polymerization method, a method of adjusting the amount of the polymerization initiator, and a method of changing a polymerization temperature.

Only one of these methods for controlling the molecular weight may be used singly, or two or more of the methods may be used in combinations.

In the methacrylic resin, a chain transfer agent (molecular weight adjuster) may be used for the purpose of improving the thermal stability of the methacrylic resin, in addition to the purpose of adjusting the molecular weight. The chain transfer agent to be used is not limited by its type and use method as long as the advantageous effects of the present invention can be exerted.

<Production Method by Suspension Polymerization Method>

In the case of producing the methacrylic resin by suspension polymerization such as an organic suspension polymerization method or an inorganic suspension polymerization method, the methacrylic resin is produced in a particle form through a polymerization step using a stirring apparatus mentioned later, a washing step, a dehydration step, and a drying step.

Usually, an aqueous suspension polymerization method using water as a medium is suitably used.

[Polymerization Step]

In the polymerization step, a predetermined stirring apparatus is used, and raw material monomers, a suspending agent, and optionally, a polymerization initiator and other additives are appropriately supplied into the stirring apparatus where polymerization is then performed to obtain a slurry of a methacrylic resin.

Examples of the stirring apparatus that is used in the polymerization step for obtaining the methacrylic resin by the suspension polymerization method include stirring apparatuses known in the art such as a stirring apparatus having a stirring impeller such as a pitched paddle impeller, a flat paddle impeller, a propeller impeller, an anchor impeller, a Pfaudler impeller (recessed impeller), a turbine impeller, a Bulmarzin impeller, a Maxblend impeller, a Fullzone impeller, a ribbon impeller, a Super-Mix impeller, an Inter-Mig impeller, a special impeller, or an axial flow impeller in the inside, a stirring apparatus having a shovel blade in the inside, a stirring apparatus having a chopper blade in the inside, and a stirring apparatus having a rotary disc such as a circular disc type, a notched disc type or a screw type in the inside.

The stirring rate at the time of polymerization is preferably on the order of 1 to 500 rpm on the grounds that an appropriate particle size can be obtained, the content of a methacrylic resin component having a particle size of smaller than 0.15 mm can be reduced, and polymerization stability is improved, for example, though the stirring rate depends on the type of the stirring apparatus used, the stirring efficiency of the stirring impeller, and the capacity of a polymerization vessel, etc.

The temperature in adding a raw material mixture of the methacrylic resin can be in any range in which the advantageous effects of the present invention can be exerted, and is preferably 0° C. or higher and equal to or lower than the boiling points of the raw materials used. A high temperature changes the composition of the copolymer constituting the resulting methacrylic resin because the raw materials volatilize easily when added. A low temperature of lower than 0° C. requires time for temperature rise after raw material addition. Therefore, it is preferred to add the raw material mixture at a certain temperature.

Specifically, the temperature is preferably 0° C. or higher and 85° C. or lower, more preferably 10° C. or higher and 85° C. or lower, further preferably 30° C. or higher and 85°

C. or lower, still further preferably 50° C. or higher and 80° C. or lower, even further preferably 60° C. or higher and 80° C. or lower.

The temperature in the suspension polymerization step is preferably 40° C. or higher and 90° C. or lower in consideration of productivity and the amount of an aggregate formed. The temperature is more preferably 50° C. or higher and 85° C. or lower, further preferably 60° C. or higher and 85° C. or lower, still further preferably 65° C. or higher and 83° C. or lower.

The polymerization time in the suspension polymerization is preferably 20 minutes or longer and 240 minutes or shorter from the viewpoint of effectively suppressing heat generation at the time of polymerization, and reducing aggregate formation mentioned later and reducing the amount of a residual monomer. The polymerization time is more preferably 30 minutes or longer and 210 minutes or shorter, further preferably 45 minutes or longer and 180 minutes or shorter, still further preferably 60 minutes or longer and 180 minutes or shorter, even further preferably 90 minutes or longer and 150 minutes or shorter.

After the polymerization step, the temperature is preferably raised to a temperature higher than the polymerization temperature and held for a given time, from the viewpoint of reduction in the amount of a residual monomer.

The temperature in holding is preferably a temperature higher than the polymerization temperature and is preferably a temperature raised to at least 5° C. higher than the polymerization temperature, from the viewpoint that the degree of polymerization can be enhanced.

In the case of raising the temperature, a temperature equal to or lower than the glass transition temperature of the resulting methacrylic resin is preferred from the viewpoint of preventing the aggregation of the resulting polymer.

Specifically, the temperature is 120° C. or lower, preferably 100° C. or lower, more preferably 80° C. or higher and 100° C. or lower, further preferably 85° C. or higher and 100° C. or lower, still further preferably 88° C. or higher and 100° C. or lower, even further preferably 90° C. or higher and 100° C. or lower.

The polymerization is performed according to the polymerization temperature and the holding temperature mentioned above, and the holding time mentioned later. As a result, polymer particles having a small angle of repose can be formed after the drying step mentioned later.

The time for which the temperature is held after the temperature rise is preferably 15 minutes or longer and 360 minutes or shorter, more preferably 30 minutes or longer and 240 minutes or shorter, further preferably 30 minutes or longer and 180 minutes or shorter, still further preferably 30 minutes or longer and 150 minutes or shorter, even further preferably 30 minutes or longer and 120 minutes or shorter, in consideration of the effect of reducing the amount of a residual monomer.

For the purpose of reducing the amount of a residual monomer, an organic solvent can be used in the polymerization without influencing polymerization stability. The organic solvent that can be suitably used can be any solvent capable of dissolving the resulting methacrylic resin. An aromatic hydrocarbon solvent such as xylene, toluene, or ethylbenzene can be suitably used.

The amount of the organic solvent used is preferably 15 parts by mass or less, more preferably 10 parts by mass or less, further preferably 8 parts by mass or less, still further preferably 6 parts by mass or less, per 100 parts by mass in total of the monomers used.

[Washing Step]

The slurry of the methacrylic resin obtained through the polymerization step mentioned above is preferably subjected to an operation such as acid washing, water washing, or alkali washing for the removal of the suspending agent.

The number of times of such a washing operation can be selected as the optimum number of times from working efficiency and suspending agent removal efficiency. The washing operation may be performed once or repetitively plural times.

The temperature in performing washing can be selected as the optimum temperature in consideration of suspending agent removal efficiency and the degree of coloring of the methacrylic resin of interest, etc., and is preferably 20 to 100° C. The temperature is more preferably 30 to 95° C., further preferably 40 to 95° C.

The washing time per wash is preferably 10 to 180 minutes, more preferably 20 to 150 minutes, from the viewpoint of washing efficiency, the effect of reducing the angle of repose of methacrylic resin particles, and a convenient step.

The pH of the washing solution for use in washing can be in any range in which the suspending agent can be removed, and is preferably pH 1 to 12.

In the case of performing acid washing, the pH is preferably pH 1 to 5, more preferably pH 1.2 to 4, from the viewpoint of suspending agent removal efficiency and the color of the resulting methacrylic resin.

The acid for use in this operation can be any acid capable of removing the suspending agent and is not particularly defined. A conventional inorganic acid or organic acid known in the art can be used.

Examples of the acid that is suitably used include inorganic acids such as hydrochloric acid, nitric acid, sulfuric acid, phosphoric acid, and boric acid, each of which may be diluted with water or the like and used as a diluted solution. Examples of the organic acid include acids having a carboxyl group, a sulfo group, a hydroxy group, a thiol group, or enol.

Nitric acid, sulfuric acid, and organic acids having a carboxyl group are more preferred in consideration of the effect of removing the suspending agent and the color of the resulting methacrylic resin.

After the acid washing, it is preferred to further perform water washing or alkali washing, from the viewpoint of the color of the methacrylic resin of interest and reduction in the angle of repose of resin particles.

In the case of performing alkali washing, the pH of the alkali solution is preferably pH 7.1 to 12, more preferably pH 7.5 to 11, further preferably 7.5 to 10.5.

A tetraalkyl ammonium hydroxide, an alkali metal hydroxide, an alkaline earth metal hydroxide, or the like is suitably used as the alkaline component for use in the alkali washing. The alkaline component is more preferably an alkali metal hydroxide or an alkaline earth metal hydroxide, further preferably lithium hydroxide, sodium hydroxide, potassium hydroxide, rubidium hydroxide, cesium hydroxide, magnesium hydroxide, calcium hydroxide, or barium hydroxide, still further preferably lithium hydroxide, sodium hydroxide, potassium hydroxide, magnesium hydroxide, or calcium hydroxide, even further preferably sodium hydroxide or potassium hydroxide.

These alkaline components can be used after being pH-adjusted by dilution with water or the like.

[Dehydration Step]

A conventional method known in the art can be applied to a method for dehydrating the obtained polymer slurry of the methacrylic resin to separate methacrylic resin particles.

Examples thereof include a dehydration method using a centrifuge that shakes off water through the use of centrifugal force, and a method of removing water by suction on a porous belt or a filtration membrane to separate methacrylic resin particles.

[Drying Step]

The methacrylic resin in a water-containing state obtained through the dehydration step mentioned above can be subjected to drying treatment by a method known in the art and recovered.

Examples thereof include hot air drying of performing drying by sending hot air into a vessel from a hot air blower, a blow heater, or the like, vacuum drying of performing drying by warming, if necessary, after reduction in internal pressure of the system, barrel drying of draining water from the obtained polymer by rotation in a container, and spin drying of performing drying through the use of centrifugal force.

Only one of these methods may be used singly, or two or more thereof may be used in combinations.

The water content of the resulting methacrylic resin is preferably 0.01% by mass to 1% by mass, more preferably 0.05% by mass to 1% by mass, further preferably 0.1% by mass to 1% by mass, still further preferably 0.27% by mass to 1% by mass, in consideration of the handleability, color, etc. of the resulting methacrylic resin.

The water content of the resulting methacrylic resin can be measured by use of a Karl Fischer method.

In the case of producing the methacrylic resin by use of the suspension polymerization method mentioned above, the resulting methacrylic resin usually has a substantially spherical shape, but may partially form an aggregate.

In the present specification, the aggregate refers to a residue remaining on a sieve of a 1.68 mm mesh when the obtained polymer is sifted through the sieve.

When the aggregate remains in the methacrylic resin, the color of the resulting methacrylic resin tends to be reduced. From such a viewpoint, the content of the aggregate in the methacrylic resin is preferably 1.2% by mass or less, more preferably 1.0% by mass or less.

The content of the aggregate can be calculated as the amount of aggregated matter formed (% by mass) by drying a residue on a sieve of a 1.68 mm mesh after shifting, for 12 hours in a drying oven of 80° C., then measuring its mass, and dividing the obtained mass by the total amount of the raw materials.

The average particle size of the methacrylic resin obtained by use of the suspension polymerization method mentioned above is preferably 0.1 mm or larger in consideration of workability at the time of molding or extrusion, etc. and is more preferably 0.1 mm or larger and 1 mm or smaller, further preferably 0.1 mm or larger and 0.5 mm or smaller, still further preferably 0.1 mm or larger and 0.4 mm or smaller, in consideration of the color of a molded piece obtained by molding.

The average particle size can be measured, for example, by using sieves (manufactured by Tokyo Screen Co., Ltd., JTS-200-45-44 (opening size: 500 μm), 34 (opening size: 425 μm), 35 (opening size: 355 μm), 36 (opening size: 300 μm), 37 (opening size: 250 μm), 38 (opening size: 150 μm), and 61 (pan)) based on JIS-Z8801, and sifting for 10 minutes with the maximum vibration force using a screening tester TSK B-1, measuring the mass of particles remaining on each sieve, and determining a particle size at which the mass reaches 50%.

<Production Method by Solution Polymerization Method>

Hereinafter, preferred examples of the method for producing the methacrylic resin can also include a solution polymerization method described in Japanese Patent Laid-Open No. 2017-125185.

(Additional Component)

<Additional Resin>

The methacrylic resin composition of the present embodiment may contain an additional resin known in the art in combination with the methacrylic resin as long as the methacrylic resin composition of the present embodiment can exert required characteristics.

Examples of the additional resin include thermoplastic resins. Examples of the thermoplastic resin include, but are not limited to, rubbery polymers such as acrylic rubber, polyethylene resins, polypropylene resins, polystyrene resins, syndiotactic polystyrene resins, polycarbonate resins, ABS resin, acrylic resins, AS resin, BAAS resins, MBS resin, AAS resin, biodegradable resins, polycarbonate-ABS resin alloys, polyalkylene arylate resins (polybutylene terephthalate, polyethylene terephthalate, polypropylene terephthalate, polytrimethylene terephthalate, polyethylene naphthalate, etc.), polyamide resins, polyphenylene ether resins, polyphenylene sulfide resins, and phenol resins.

Particularly, AS resin and BAAS resin are preferred from the viewpoint of improvement in fluidity. Acrylic rubbery polymers, ABS resin, and MBS resin are preferred from the viewpoint of improvement in impact resistance. Polyester resin is preferred from the viewpoint of improvement in chemical resistance.

Polycarbonate resins are preferred when it is necessary to impart heat resistance, impart impact resistance, or adjust optical characteristics. Acrylic resins have favorable compatibility with the methacrylic resin mentioned above and are preferred for adjusting characteristics such as fluidity and impact resistance while retaining transparency.

Only one of these various thermoplastic resins may be used singly, or two or more of the resins may be used in combinations.

In the case of combining the methacrylic resin mentioned above with the additional resin in the methacrylic resin composition of the present embodiment, the blending ratio can be in any range in which the advantageous effects of the present invention can be exerted. In the case of blending a general-purpose acrylic resin as the additional resin, the blending ratio of the additional resin is preferably 95% by mass or less, more preferably 85% by mass or less, further preferably 80% by mass or less, still further preferably 75% by mass or less, per 100% by mass in total of the methacrylic resin mentioned above and the additional resin in consideration of the effect of imparting characteristics.

In the case of blending a resin other than acrylic resins as the additional resin, its blending ratio is preferably 50% by mass or less, more preferably 45% by mass, further preferably 40% by mass or less, still further preferably 30% by mass or less, even further preferably 20% by mass or less, per 100% by mass in total of the methacrylic resin mentioned above and the additional resin.

In the case of blending the additional resin, the lower limit value of the amount of the additional resin blended is preferably 0.1% by mass or more, more preferably 1% by mass or more, further preferably 2% by mass or more, still further preferably 3% by mass or more, even further preferably 5% by mass or more, in consideration of the effect of imparting characteristics when the additional resin is blended.

The type and the content of the additional resin can be appropriately selected according to an effect expected from use in combination with the additional resin.

<Additive>

In the methacrylic resin composition of the present embodiment, an additional additive may be optionally blended. The additive can be appropriately selected according to a purpose without particular limitations as long as the advantageous effects of the present invention can be exerted.

Examples of the additive include, but are not limited to: various stabilizers such as ultraviolet absorbers, thermal stabilizers, and light stabilizers; plasticizers (paraffin process oils, naphthene process oils, aromatic process oils, paraffin, organic polysiloxane, and mineral oils); flame retardants (e.g., phosphorus flame retardants such as organic phosphorus compounds, red phosphorus, and inorganic phosphate, halogen flame retardants, silica flame retardants, and silicone flame retardants); flame retardant promoters (e.g., antimony oxides, metal oxides, and metal hydroxides); curing agents (amines such as diethylenetriamine, triethylenetetramine, tetraethylenepentamine, pentaethylenehexamine, diethylaminopropylamine, 3,9-bis(3-aminopropyl)-2,4,8,10-tetraoxaspiro[5,5]undecane, menthenediamine, isophoronediamine, N-aminoethylpiperazine, m-xylenediamine, m-phenylenediamine, diaminophenylmethane, diaminodiphenyl sulfone, dicyandiamide, and dihydrazide adipate, phenol resins such as phenol novolac resin and cresol novolac resin, polymercaptans such as liquid polymercaptan and polysulfide, and acid anhydrides such as phthalic anhydride, tetrahydrophthalic anhydride, hexahydrophthalic anhydride, methyltetrahydrophthalic anhydride, methylhexahydrophthalic anhydride, methylnadic anhydride, pyromellitic anhydride, methylcyclohexenetetracarboxylic anhydride, dodecylsuccinic anhydride, trimellitic anhydride, chlorendic anhydride, benzophenonetetracarboxylic anhydride, and ethylene glycol bis(anhydrotrimate)); curing accelerators (imidazoles such as 2-methylimidazole, 2-ethylimidazole, 2-ethyl-4-methylimidazole, 2-phenylimidazole, 2-undecylimidazole, 2-heptadecylimidazole, and 2-phenyl-4-methylimidazole, organic phosphines such as triphenylphosphine and tributylphosphine, tertiary amines such as benzyldimethylamine, 2-dimethylaminomethylphenol, 2,4,6-tris(diaminomethyl)phenol, and tetramethylhexanediamine, boron salts such as triphenylphosphine tetraphenylborate, tetraphenylphosphonium tetraphenylborate, and triethylamine tetraphenylborate, and quinoid compounds such as 1,4-benzoquinone, 1,4-naphthoquinone, 2,3-dimethyl-1,4-benzoquinone, 2,6-dimethylbenzoquinone, and 2,3-dimethoxy-1,4-benzoquinone, etc.); antistatic agents (e.g., polyamide elastomers, quaternary ammonium salts, pyridine derivatives, aliphatic sulfonates, aromatic sulfonates, aromatic sulfonate copolymers, sulfuric acid ester salts, polyhydric alcohol partial esters, alkyl diethanolamine, alkyl diethanolamide, polyalkylene glycol derivatives, betaines, and imidazoline derivatives); conductivity-imparting agents; stress releasers; mold release agents (alcohols, esters of an alcohol and fatty acid, esters of an alcohol and dicarboxylic acid, and silicone oils, etc.); crystallization accelerators; hydrolysis inhibitors; lubricants (e.g., higher fatty acids and metal salts thereof, such as stearic acid, behenic acid, zinc stearate, calcium stearate, and magnesium stearate, and higher fatty acid amides such as ethylenebisstearamide); impact-imparting agents; slidability-improving agents (hydrocarbons such as low-molecular-weight polyethylene, higher alcohols, polyhydric alcohols, polyglycol, polyglycerol, higher fatty acids, higher fatty acid metal salts, fatty acid amides, esters of fatty acid and an aliphatic alcohol, full esters or partial esters of fatty acid and a polyhydric alcohol, full esters or partial esters of fatty acid and polyglycol, silicones, and fluorine resins, etc.): compatibilizers; nucleophiles; reinforcing agents such as fillers; flow adjusters; dyes (dyes such as nitroso dyes, nitro dyes, azo dyes, stilbene azo dyes, ketoimine dyes, triphenylmethane dyes, xanthene dyes, acridine dyes, quinoline dyes, methine/polymethine dyes, thiazole dyes, indamine/indophenol dyes, azine dyes, oxazine dyes, thiazine dyes, sulfide dyes, aminoketone/oxyketone dyes, anthraquinone dyes, indigoid dyes, and phthalocyanine dyes); sensitizers; colorants (inorganic pigments such as titanium oxide, carbon black, titanium yellow, iron oxide pigments, ultramarine, cobalt blue, chromium oxide, spinel green, lead chromate pigments, and cadmium pigments, organic pigments such as azo pigments such as azo lake pigments, benzimidazolone pigments, diarylide pigments, and condensed azo pigments, phthalocyanine pigments such as phthalocyanine blue and phthalocyanine green, and condense polycyclic pigments such as isoindolinone pigments, quinophthalone pigments, quinacridone pigments, perylene pigments, anthraquinone pigments, perinone pigments, and dioxazine violet, metallic pigments of aluminum flakes, spherical aluminum pigments which are used for improving weld appearance, mice powders for metallic pigments with pearl luster, and other metallic pigments such as metal-plated or metal-sputtered polyhedral particles of inorganic matter such as glass, etc.); thickeners; antisettling agents; anti-sagging agents; fillers (fibrous reinforcing agents such as glass fiber and carbon fiber, glass beads, calcium carbonate, talc, and clay, etc.); antifoaming agents (silicone antifoaming agents, and organic antifoaming agents such as surfactants, polyether, and higher alcohols, etc.); coupling agents; light-diffusing fine particles; rust preservatives, antibacterial and antifungal agents; antifoulants; and conductive polymers.

<Light Stabilizer>

The methacrylic resin composition of the present embodiment may be supplemented with a light stabilizer in order to render weather resistance more favorable.

A hindered amine light stabilizer (HALS) can be suitably added as the light stabilizer.

Examples of the light stabilizer that is suitably used include, but are not limited to, bis(2,2,6,6-tetramethyl-4-piperidyl) sebacate, bis(1-octyloxy-2,2,6,6-tetramethyl-4-piperidyl) sebacate, bis(1,2,2,6,6-pentamethyl-4-piperidinyl) sebacate, bis(1,2,2,6,6-pentamethyl-4-piperidyl) 2-(3,5-di-tert-butyl-4-hydroxybenzyl)-2-n-butylmalonate, tetrakis(1,2,2,6,6-pentamethyl-4-piperidyl)1,2,3,4-butanetetracarboxylate, 1,2,2,6,6-pentamethyl-4-piperidyl/tridecyl-1,2,3,4-butanetetracarboxylate, and {1,2,2,6,6-pentamethyl-4-piperidyl/β,β,β',β'-tetramethyl-3,9-[2,4,8,10-tetraoxaspiro(5,5)undecane]diethyl}-1,2,3,4-butanetetracarboxylate.

Other examples thereof include dimethyl-1-(2-hydroxyethyl)-4-hydroxy-2,2,6,6-tetramethylpiperidine succinate polycondensates, N,N'-bis(3-aminopropyl)ethylenediamine-2,4-bis[N-butyl-N-(1,2,2,6,6-pentamethyl-4-piperidyl)amino]-6-chloro-1,3,5-triazine condensates, poly[[6-[(1,1,3,3-tetramethylbutyl)amino]-1,3,5-triazine-2,4-diyl][(2,2,6,6-tetramethyl-4-piperidinyl)imino]], poly[{6-(1,1,3-trimethylpentyl)amino-1,3,5-triazine-2,4-diyl}{(N-methyl-2,2,6,6-tetramethyl-piperidyl)imino}octamethylene{(N-methyl-2,2,6,6-tetramethyl-piperidyl)imino}], poly[(6-morpholino-S-triazine-2,4-di)[1,2,2,6,6-pentamethyl-4-piperidyl]imino]-hexamethylene[(1,2,2,6,6-pentamethyl-4-piperidyl)imino]], poly[{6-(1,1,3,3-tetramethylbutyl)amino-1,3,5-triazine-2,4-diyl}{(2,2,6,6-tetramethylpiperidyl)imino}hexamethylene{(2,2,6,6-tetramethyl-piperidyl)imino}], bis(1,2,2,6,6-pentamethyl-4-piperidyl)[[3,5-bis(1,1-dimethylethyl)-4-hydroxyphenyl]methyl]butylmalonate, mixtures of bis(1,2,2,6,6-pentamethyl-4-piperidyl) sebacate and methyl 1,2,2,6,6-pentamethyl-4-piperidylsebacate, bis(2,2,6,6-tetramethyl-4-piperidyl) sebacate, N,N'-bis(2,2,6,6-tetramethyl-4-piperidyl)-N,N'-diformylhexamethylenediamine, polycondensates of dibutylamine-1,3,5-triazine, N,N'-bis(2,2,6,6-tetramethyl-4-piperidyl-1,6-hexamethylenediamine, and N-(2,2,6,6-tetramethyl-4-piperidyl)butylamine, poly[{6-(1,1,3,3-tetramethylbutyl)amino-1,3,5-triazine-2,4-diyl}{2,2,6,6-tetramethyl-4-piperidyl)imino}hexamethylene{(2,2,6,6-tetramethyl-4-piperidyl)imino}], tetrakis(1,2,2,6,6-pentamethyl-4-piperidyl)butane-1,2,3,4-tetracarboxylate, tetrakis(2,2,6,6-tetramethyl-4-piperidyl)butane-1,2,3,4-tetracarboxylate, reaction products of 1,2,2,6,6-pentamethyl-4-piperidinol and β,β,β',β'-tetramethyl-2,4,8,10-tetraoxaspiro[5.5]undecane-3,9-diethanol, reaction products of 2,2,6,6-tetramethyl-4-piperidinol and β,β,β',β'-tetramethyl-2,4,8,10-tetraoxaspiro[5.5]undecane-3,9-diethanol, bis(1-undecanoxy-2,2,6,6-tetramethylpiperidin-4-yl) carbonate, 1,2,2,6,6-pentamethyl-4-piperidyl methacrylate, and 2,2,6,6-tetramethyl-4-piperidyl methacrylate.

Among them, bis(1,2,2,6,6-pentamethyl-4-piperidyl)[[3,5-bis(1,1-dimethylethyl)-4-hydroxyphenyl]methyl]butylmalonate, a polycondensate of dibutylamine-1,3,5-triazine, N,N'-bis(2,2,6,6-tetramethyl-4-piperidyl-1,6-hexamethylenediamine, and N-(2,2,6,6-tetramethyl-4-piperidyl)butylamine, poly[{6-(1,1,3,3-tetramethylbutyl)amino-1,3,5-triazine-2,4-diyl}{2,2,6,6-tetramethyl-4-piperidyl)imino}hexamethylene{(2,2,6,6-tetramethyl-4-piperidyl)imino}], a reaction product of 1,2,2,6,6-pentamethyl-4-piperidinol and β,β,β',β'-tetramethyl-2,4,8,10-tetraoxaspiro[5.5]undecane-3,9-diethanol, 2,2,6,6-tetramethyl-4-piperidinol and β,β,β',β'-tetramethyl-2,4,8,10-tetraoxaspiro[5.5]undecane-3,9-diethanol, or the like having three or more ring structures is suitably used from the viewpoint of the thermal stability of the light stabilizer.

<Thermal Stabilizer>

Examples of the thermal stabilizer include, but are not limited to, (a) a hindered phenol antioxidant, (b-1) a phosphorus antioxidant, and (b-2) a sulfur antioxidant.

The methacrylic resin composition of the present embodiment is suitably used for various purposes such as melt extrusion, injection molding, and film forming. Heat history to be received upon processing differs depending on a processing method and varies from only several tens of seconds, as in extruders, to several tens of minutes to several hours, as in molding processing into thick products or sheet forming, for which the methacrylic resin composition receives the heat history.

In the case of receiving heat history for a long time, it is necessary to increase the amount of the thermal stabilizer added for obtaining the desired thermal stability. A plurality of thermal stabilizers are preferably used in combination from the viewpoint of the suppression of thermal stabilizer bleed-out and the prevention of films from adhering to rolls at the time of film formation. For example, at least one member selected from (b-1) a phosphorus antioxidant and (b-2) a sulfur antioxidant, and (a) a hindered phenol antioxidant are preferably used in combination.

One of or two or more in combinations of these antioxidants may be used.

The thermal stabilizer is preferably a binary system using the hindered phenol antioxidant (a) and the sulfur antioxidant (b-2), or a binary system using the hindered phenol antioxidant (a) and the phosphorus antioxidant (b-1), from the viewpoint of much better thermal stability in the air. Particularly, the thermal stabilizer is more preferably a ternary system using three members, i.e., the hindered phenol antioxidant (a), the phosphorus antioxidant (b-1), and the sulfur antioxidant (b-2), from the viewpoint of excellent thermal stability in the air over a short period and a long period.

Examples of the thermal stabilizer include, but are not limited to, pentaerythritol tetrakis[3-(3,5-di-tert-butyl-4-hydroxyphenyl)propionate], thiodiethylenebis[3-(3,5-di-tert-butyl-4-hydroxyphenyl)propionate], octadecyl-3-(3,5-di-tert-butyl-4-hydroxyphenyl)propionate, 3,3',3",5,5',5"-hexa-tert-butyl-a,a',a"-(mesitylene-2,4,6-triyl)tri-p-cresol, 4,6-bis(octylthiomethyl)-o-cresol, 4,6-bis(dodecylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, 1,3,5-tris[(4-tert-butyl-3-hydroxy-2,6-xylyl)methyl]-1,3,5-triazine-2,4,6(1H,3H,5H)-trione, 2,6-di-tert-butyl-4-(4,6-bis(octylthio)-1,3,5-triazin-2-ylamine)phenol, 2-[1-(2-hydroxy-3,5-di-tert-pentylphenyl)ethyl]-4,6-di-tert-pentylphenyl acrylate, and 2-tert-butyl-4-methyl-6-(2-hydroxy-3-tert-butyl-5-methylbenzyl)phenyl acrylate.

Particularly, pentaerythritol tetrakis[3-(3,5-di-tert-butyl-4-hydroxyphenyl)propionate], octadecyl-3-(3,5-di-t-butyl-4-hydroxyphenyl)propionate, and 2-[1-(2-hydroxy-3,5-di-tert-pentylphenyl)ethyl]-4,6-di-tert-pentylphenyl acrylate are preferred.

A commercially available phenol antioxidant may be used as the hindered phenol antioxidant (a) serving as the thermal stabilizer. Examples of such a commercially available phenol antioxidant include, but are not limited to, Irganox 1010 (pentaerythritoltetrakis[3-(3,5-di-t-butyl-4-hydroxyphenyl)propionate], manufactured by BASF SE), Irganox 1076 (octadecyl-3-(3,5-di-t-butyl-4-hydroxyphenyl)propionate, manufactured by BASF SE), Irganox 1330 (3,3',3",5,5',5"-hexa-t-butyl-a,a',a"-(mesitylene-2,4,6-triyl)tri-p-cresol, manufactured by BASF SE), Irganox 3114 (1,3,5-tris(3,5-di-t-butyl-4-hydroxybenzyl)-1,3,5-triazine-2,4,6(1H,3H,5H)-trione, manufactured by BASF SE), Irganox 3125 (manufactured by BASF SE), ADK STAB AO-60 (pentaerythritoltetrakis[3-(3,5-di-t-butyl-4-hydroxyphenyl)propionate], manufactured by ADEKA Corp.), ADK STAB AO-80 (3,9-bis{2-[3-(3-t-butyl-4-hydroxy-5-methylphenyl)propionyloxy]-1,1-dimethylethyl}-2,4,8,10-tetraoxaspiro[5.5]undecane, manufactured by ADEKA Corp.), Sumilizer BHT (manufactured by Sumitomo Chemical Co., Ltd.), Cyanox 1790 (manufactured by Cytec Industries Inc.), Sumilizer GA-80 (manufactured by Sumitomo Chemical Co., Ltd.), Sumilizer GS (2-[1-(2-hydroxy-3,5-di-tert-pentylphenyl)ethyl]-4,6-di-tert-pentylphenyl acrylate, manufactured by Sumitomo Chemical Co., Ltd.), Sumilizer GM (2-tert-butyl-4-methyl-6-(2-hydroxy-3-tert-butyl-5-methylbenzyl)phenyl acrylate, manufactured by Sumitomo Chemical Co., Ltd.), and vitamin E (manufactured by Eisai Co., Ltd.).

Among these commercially available hindered phenol antioxidants, Irganox 1010, ADK STAB AO-60, ADK STAB AO-80, Irganox 1076, Sumilizer GS, and the like are preferred from the viewpoint of the effect of imparting thermal stability to the methacrylic resin.

Only one of these hindered phenol antioxidants may be used singly, or two or more thereof may be used in combinations.

Examples of the phosphorus antioxidant (b-1) serving as the thermal stabilizer include, but are not limited to, tris(2, 4-di-t-butylphenyl)phosphite, phosphorus acid bis(2,4-bis (1,1-dimethylethyl)-6-methylphenyl)ethyl ester, tetrakis(2, 4-di-t-butylphenyl) (1,1-biphenyl)-4,4'-diylbisphosphonite, bis(2,4-di-t-butylphenyl)pentaerythritol diphosphite, bis(2, 6-di-t-butyl-4-methylphenyl)pentaerythritol diphosphite, bis (2,4-dicumylphenyl)pentaerythritol-diphosphite, tetrakis(2, 4-t-butylphenyl) (1,1-biphenyl)-4,4'-diylbisphosphonite, di-t-butyl-m-cresyl-phosphonite, and 4-[3-[(2,4,8,10-tetra-tert-butyldibenzo[d,f][1,3,2]dioxaphosphepin)-6-yloxy]propyl]-2-methyl-6-tert-butylphenol.

A commercially available phosphorus antioxidant may be used as the phosphorus antioxidant (b-1). Examples of such a commercially available phosphorus antioxidant include, but are not limited to, Irgafos 168 (tris(2,4-di-t-butylphenyl) phosphite, manufactured by BASF SE), Irgafos 12 (tris[2-[[2,4,8,10-tetra-t-butyldibenzo[d,f][1,3,2]dioxaphosphepin-6-yl]oxy]ethyl]amine, manufactured by BASF SE), Irgafos 38 (phosphorus acid bis(2,4-bis(1,1-dimethylethyl)-6-methylphenyl)ethyl ester, manufactured by BASF SE), ADK STAB 329K (manufactured by ADEKA Corp.), ADK STAB PEP-36 (manufactured by ADEKA Corp.), ADK STAB PEP-36A (manufactured by ADEKA Corp.), ADK STAB PEP-8 (manufactured by ADEKA Corp.), ADK STAB HP-10 (manufactured by ADEKA Corp.), ADK STAB 2112 (manufactured by ADEKA Corp.), ADK STAB 1178 (manufactured by ADEKA Corp.), ADK STAB 1500 (manufactured by ADEKA Corp.), Sandstab P-EPQ (manufactured by Clariant AG), Weston 618 (manufactured by General Electric Company), Weston 619G (manufactured by General Electric Company), Ultranox 626 (manufactured by General Electric Company), Sumilizer GP (4-[3-[(2,4,8,10-tetra-tert-butyldibenzo[d,f][1,3,2]dioxaphosphepin)-6-yloxy]propyl]-2-methyl-6-tert-butylphenol, manufactured by Sumitomo Chemical Co., Ltd.), and HCA (9,10-dihydro-9-oxa-10-phosphaphenanthrene-10-oxide, manufactured by Sanko Co., Ltd.).

Among these commercially available phosphorus antioxidants, Irgafos 168, ADK STAB PEP-36, ADK STAB PEP-36A, ADK STAB HP-10, and ADK STAB 1178 are preferred, and ADK STAB PEP-36A and ADK STAB PEP-36 are particularly preferred, from the viewpoint of the effect of imparting thermal stability to the methacrylic resin and an effect brought about by use of multiple antioxidants in combination.

Only one of these phosphorus antioxidants may be used singly, or two or more thereof may be used in combinations.

Examples of the sulfur antioxidant (b-2) serving as the thermal stabilizer include, but are not limited to, 2,4-bis (dodecylthiomethyl)-6-methylphenol (Irganox 1726, manufactured by BASF SE), Irganox 1520L (manufactured by BASF SE), 2,2-bis{[3-(dodecylthio)-1-oxopropoxy] methyl}propane-1,3-diylbis[3-dodecylthio]propionate] (ADK STAB AO-412S, manufactured by ADEKA Corp.), 2,2-bis{[3-(dodecylthio)-1-oxopropoxy]methyl}propane-1, 3-diylbis[3-dodecylthio]propionate] (Cheminox PLS, manufactured by Chemipro Kasei Corp.), and di(tridecyl)3, 3'-thiodipropionate (AO-503, manufactured by ADEKA Corp.).

Among these commercially available sulfur antioxidants, ADK STAB AO-412S and Cheminox PLS are preferred from the viewpoint of the effect of imparting thermal stability to the methacrylic resin and an effect brought about by use of multiple antioxidants in combination and from the viewpoint of handleability.

Only one of these sulfur antioxidants may be used singly, or two or more thereof may be used in combinations.

The content of the thermal stabilizer can be any amount that produces the effect of improving thermal stability, and is preferably 5 parts by mass or less, more preferably 3 parts by mass or less, further preferably 1 part by mass or less, still further preferably 0.8 parts by mass or less, even further preferably 0.01 to 0.8 parts by mass, particularly preferably 0.01 to 0.5 parts by mass, per 100 parts by mass of the methacrylic resin because an excessive content might cause problems such as bleed-out at the time of processing.

The methacrylic resin composition preferably comprises 0.01 to 2 parts by mass (preferably 0.02 to 1 parts by mass) of the hindered phenol antioxidant (a) and 0.01 to 2 parts by mass (preferably 0.01 to 1 parts by mass) in total of the phosphorus antioxidant (b-1) and the sulfur antioxidant (b-2) per 100 parts by mass of the methacrylic resin from the viewpoint of suppressing deterioration in color of the resulting molded article by suppressing the thermal decomposition of the methacrylic resin, and preventing silver streaks at the time of molding processing by suppressing the volatilization of the thermal stabilizer. From a similar viewpoint, the methacrylic resin composition preferably comprises 0.01 to 2 parts by mass (preferably 0.02 to 1 parts by mass) of the hindered phenol antioxidant (a) and 0.01 to 2 parts by mass (preferably 0.01 to 1 parts by mass) in total of the phosphorus antioxidant (b-1) and/or the sulfur antioxidant (b-2) per 100 parts by mass of the methacrylic resin.

<Lubricant>

Examples of the lubricant include, but are not limited to, fatty acid esters, fatty acid amides, fatty acid metal salts, hydrocarbon lubricants, and alcohol lubricants.

The fatty acid ester that may be used as the lubricant is not particularly limited, and a conventional fatty acid ester known in the art can be used.

For example, an ester compound of a fatty acid having 12 to 32 carbon atoms such as lauric acid, palmitic acid, heptadecanoic acid, stearic acid, oleic acid, arachic acid, or behenic acid, and a monohydric aliphatic alcohol such as palmityl alcohol, stearyl alcohol, or behenyl alcohol, or a polyhydric aliphatic alcohol such as glycerin, pentaerythritol, dipentaerythritol, or sorbitan; or a complex ester compound of a fatty acid, a polybasic organic acid, and a monohydric aliphatic alcohol or a polyhydric aliphatic alcohol can be used as the fatty acid ester.

Examples of such a fatty acid ester lubricant can include cetyl palmitate, butyl stearate, stearyl stearate, stearyl citrate, glycerin monocaprylate, glycerin monocaprate, glycerin monolaurate, glycerin monopalmitate, glycerin dipalmitate, glycerin monostearate, glycerin distearate, glycerin tristearate, glycerin monooleate, glycerin dioleate, glycerin trioleate, glycerin monolinoleate, glycerin monobehenate, glycerin mono-12-hydroxystearate, glycerin di-12-hydroxystearate, glycerin tri-12-hydroxystearate, glycerin diaceto-monostearate, citric and fatty acid esters of glycerol, pentaerythritol adipate-stearate, partially saponified montanate, pentaerythritol tetrastearate, dipentaerythritol hexastearate, and sorbitan tristearate.

One of these fatty acid ester lubricants may be used singly, or two or more thereof may be used in combinations.

Examples of commercially available products of the fatty acid ester lubricant include, but are not limited to, Rikemal series, Poem series, Rikestar series, and Rikemaster series manufactured by Riken Vitamin Co., Ltd., and Excel series, Rheodol series, Exepearl series, and Coconade series manufactured by Kao Corp. and more specifically include Rikemal S-100, Rikemal H-100, Poem V-100, Rikemal B-100, Rikemal HC-100, Rikemal S-200, Poem B-200, Rikestar EW-200, Rikestar EW-400, Excel 5-95, and Rheodol MS-50.

The fatty acid amide lubricant is not particularly limited, and a conventional fatty acid amide lubricant known in the art can be used.

Examples of the fatty acid amide lubricant include: saturated fatty acid amides such as lauramide, palmitamide, stearamide, behenamide, and hydroxystearamide; unsaturated fatty acid amides such as oleamide, erucamide, and ricinolamide; substituted amides such as N-stearylstearamide, N-oleyloleamide, N-stearyloleamide, N-oleylstearamide, N-stearylerucamide, and N-oleylpalmitamide; methylol amides such as methylol stearamide and methylol behenamide; saturated fatty acid bisamides such as methylenebisstearamide, ethylenebiscaprinamide, ethylenebislauramide, ethylenebisstearamide (ethylenebisstearylamide), ethylenebisisostearamide, ethylenebishydroxystearamide, ethylenebisbehenamide, hexamethylenebisstearamide, hexamethylenebisbehenamide, hexamethylenebishydroxystearamide, N,N'-distearyladipamide, and N,N'-distearylsebacamide; unsaturated fatty acid bisamides such as ethylenebisoleamide, hexamethylenebisoleamide, N,N'-dioleyladipamide, and N,N'-dioleylsebacamide; and aromatic bisamides such as m-xylylenebisstearamide and N,N'-distearylisophthalamide.

One of these fatty acid amide lubricants may be used singly, or two or more thereof may be used in combinations.

Examples of commercially available products of the fatty acid amide lubricant include, but are not limited to, Diamide series (manufactured by Nihon Kasei Co., Ltd.), Amide series (manufactured by Nihon Kasei Co., Ltd.), Nikkamide series (manufactured by Nihon Kasei Co., Ltd.), Methylol Amide series, Bisamide series, Slipax series (manufactured by Nihon Kasei Co., Ltd.), Kao Wax series (manufactured by Kao Corp.), Fatty Acid Amide series (manufactured by Kao Corp.), and ethylenebisstearamides (manufactured by Dainichi Chemical Industry Co., Ltd.).

The fatty acid metal salt refers to a metal salt of a higher fatty acid. Examples thereof include, but are not limited to, lithium stearate, magnesium stearate, calcium stearate, calcium laurate, calcium ricinolate, strontium stearate, barium stearate, barium laurate, barium ricinolate, zinc stearate, zinc laurate, zinc ricinolate, zinc 2-ethylhexanoate, lead stearate, dibasic lead stearate, lead naphthoate, calcium 12-hydroxystearate, and lithium 12-hydroxystearate. Among them, calcium stearate, magnesium stearate, and zinc stearate are preferred because the methacrylic resin composition of the present embodiment has excellent processability and excellent transparency.

Examples of commercially available products of the fatty acid metal salt include SZ series, SC series, SM series, and SA series manufactured by Sakai Chemical Industry Co., Ltd. In the case of using a fatty acid metal salt, the amount of the fatty acid metal salt blended is preferably 0.2% by mass or less in the methacrylic resin composition of the present embodiment from the viewpoint of retaining transparency.

One of the lubricants described above may be used singly, or two or more thereof may be used in combinations.

The lubricant to be used preferably has a starting temperature of decomposition of 200° C. or higher. The starting temperature of decomposition can be measured from the temperature of 1% weight loss by TGA.

The content of the lubricant can be any amount that produces an effect as the lubricant, and is preferably 5 parts by mass or less, more preferably 3 parts by mass or less, further preferably 1 part by mass or less, still further preferably 0.8 parts by mass or less, even further preferably 0.01 to 0.8 parts by mass, particularly preferably 0.01 to 0.5 parts by mass, per 100 parts by mass of the methacrylic resin because an excessive content might cause problems such as the occurrence of bleed-out at the time of processing or poor extrusion ascribable to screw slipping.

The addition of the lubricant in an amount in the range described above is preferred because this addition tends to suppress reduction in transparency caused by the addition of the lubricant and prevent films from adhering to metal rolls at the time of film formation, and problems such as peeling are less likely to arise in long-term reliability tests after primer coating or secondary processing into molded products such as hard coats.

<Ultraviolet Absorber>

Examples of the ultraviolet absorber include, but are not limited to, benzotriazole compounds, benzotriazine compounds, benzoate compounds, benzophenone compounds, oxybenzophenone compounds, phenol compounds, oxazole compounds, malonic acid ester compounds, cyanoacrylate compounds, lactone compounds, salicylic acid ester compounds, and benzoxazinone compounds.

Examples of the benzotriazole compound include, but are not limited to, 2,2'-methylenebis[4-(1,1,3,3-tetramethylbutyl)-6-(2H-benzotriazol-2-yl)phenol], 2-(3,5-di-tert-butyl-2-hydroxyphenyl)-5-chlorobenzotriazole, 2-(2H-benzotriazol-2-yl)-p-cresol, 2-(2H-benzotriazol-2-yl)-4,6-bis(1-methyl-1-phenylethyl)phenol, 2-benzotriazol-2-yl-4,6-di-tert-butylphenol, 2-[5-chloro(2H)-benzotriazol-2-yl]-4-methyl-6-t-butylphenol, 2-(2H-benzotriazol-2-yl)-4,6-di-t-butylphenol, 2-(2H-benzotriazol-2-yl)-4-(1,1,3,3-tetramethylbutyl)phenol, 2-(2H-benzotriazol-2-yl)-4-methyl-6-(3,4,5,6-tetrahydrophthalimidylmethyl)phenol, methyl 3-(3-(2H-benzotriazol-2-yl)-5-t-butyl-4-hydroxyphenyl)propionate/polyethylene glycol 300 reaction products, 2-(2H-benzotriazol-2-yl)-6-(linear and side chain dodecyl)-4-methylphenol, 2-(5-methyl-2-hydroxyphenyl)benzotriazole, 2-[2-hydroxy-3,5-bis(α,α-dimethylbenzyl)phenyl]-2H-benzotriazole, and 3-(2H-benzotriazol-2-yl)-5-(1,1-dimethylethyl)-4-hydroxy-C7-9 side chain and linear alkyl ester.

Examples of the benzotriazine compound include, but are not limited to, 2-mono(hydroxyphenyl)-1,3,5-triazine compounds, 2,4-bis(hydroxyphenyl)-1,3,5-triazine compounds, and 2,4,6-tris(hydroxyphenyl)-1,3,5-triazine compounds and specifically include 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, 2,4-diphenyl-6-(2-hydroxy-4-butoxyethoxy)-1,3,5-triazine, 2,4-bis(2-hydroxy-4-butoxyphenyl)-6-(2,4-dibutoxyphenyl)-1,3-5-triazine, 2,4,6-tris(2-hydroxy-4-methoxyphenyl)-1,3,5-triazine, 2,4,6-tris(2-hydroxy-4-ethoxyphenyl)-1,3,5-triazine, 2,4,6-tris(2-hydroxy-4-propoxyphenyl)-1,3,5-triazine, 2,4,6-tris(2-hydroxy-4-butoxyphenyl)-1,3,5-triazine, 2,4,6-tris(2-hydroxy-4-butoxyphenyl)-1,3,5-triazine, 2,4,6-tris(2-hydroxy-4-hexyloxyphenyl)-1,3,5-triazine, 2,4,6-tris(2-hydroxy-4-octyloxyphenyl)-1,3,5-triazine, 2,4,6-tris(2-hydroxy-4-dodecyloxyphenyl)-1,3,5-triazine, 2,4,6-tris(2-hydroxy-4-benzyloxyphenyl)-1,3,5- triazine, 2,4,6-tris(2-hydroxy-4-ethoxyethoxyphenyl)-1,3,5-triazine, 2,4,6-tris(2-hydroxy-4-butoxyethoxyphenyl)-1,3,5-triazine, 2,4,6-tris(2-hydroxy-4-propoxyethoxyphenyl)-1,3,5-triazine, 2,4,6-tris(2-hydroxy-4-methoxycarbonylpropyloxyphenyl)-1,3,5-triazine, 2,4,6-tris(2-hydroxy-4-ethoxycarbonylethyloxyphenyl)-1,3,5-triazine, 2,4,6-tris(2-hydroxy-4-(1-(2-ethoxyhexyloxy)-1-oxopropan-2-yloxy)phenyl)-1,3,5-triazine, 2,4,6-tris(2-hydroxy-3-methyl-4-methoxyphenyl)-1,3,5-triazine, 2,4,6-tris(2-hydroxy-3-methyl-4-ethoxyphenyl)-1,3,5-triazine, 2,4,6-tris(2-hydroxy-3-methyl-4-propoxyphenyl)-1,3,5-triazine, 2,4,6-tris(2-hydroxy-3-methyl-4-butoxyphenyl)-1,3,5-triazine, 2,4,6-tris(2-hydroxy-3-methyl-4-butoxyphenyl)-1,3,5-triazine, 2,4,6-tris(2-hydroxy-3-methyl-4-hexyloxyphenyl)-1,3,5-triazine, 2,4,6-tris(2-hydroxy-3-methyl-4-octyloxyphenyl)-1,3,5-triazine, 2,4,6-tris(2-hydroxy-3-methyl-4-dodecyloxyphenyl)-1,3,5-triazine, 2,4,6-tris(2-hydroxy-3-methyl-4-benzyloxyphenyl)-1,3,5-triazine, 2,4,6-tris(2-hydroxy-3-methyl-4-ethoxyethoxyphenyl)-1,3,5-triazine, 2,4,6-tris(2-hydroxy-3-methyl-4-butoxyethoxyphenyl)-1,3,5-triazine, 2,4,6-tris(2-hydroxy-3-methyl-4-propoxyethoxyphenyl)-1,3,5-triazine, 2,4,6-tris(2-hydroxy-3-methyl-4-methoxycarbonylpropyloxyphenyl)-1,3,5-triazine, 2,4,6-tris(2-hydroxy-3-methyl-4-ethoxycarbonylethyloxyphenyl)-1,3,5-triazine, and 2,4,6-tris(2-hydroxy-3-methyl-4-(1-(2-ethoxyhexyloxy)-1-oxopropan-2-yloxy)phenyl)-1,3,5-triazine.

Among them, an ultraviolet absorber having 2,4-bis(2,4-dimethylphenyl)-6-[2-hydroxy-4-(3-alkyloxy-2-hydroxypropyloxy)-5-α-cumylphenyl]-s-triazine skeleton (wherein "alkyloxy" means a long-chain alkyloxy group such as octyloxy, nonyloxy, or decyloxy) is preferred from the viewpoint of high compatibility with the methacrylic resin and excellent ultraviolet absorption characteristics.

The ultraviolet absorber is particularly preferably a benzotriazole compound or a benzotriazine compound from the viewpoint of compatibility with the methacrylic resin and volatility during heating.

Only one of these ultraviolet absorbers may be used singly, or two or more thereof may be used in combinations.

The melting point (Tm) of the ultraviolet absorber is preferably 80° C. or higher, more preferably 100° C. or higher, further preferably 130° C. or higher, still further preferably 160° C. or higher.

The percentage of decrease in mass of the ultraviolet absorber when the temperature is raised from 23° C. to 260° C. at a rate of 20° C./min is preferably 50% or less, more preferably 30% or less, further preferably 15% or less, still further preferably 10% or less, even further preferably 5% or less.

The amount of the ultraviolet absorber blended can be any amount in which the advantageous effects of the present invention are exerted without inhibiting heat resistance, moist heat resistance, thermal stability, and molding processability, and is preferably 5 parts by mass or less, more preferably 3 parts by mass or less, further preferably 2.5 parts by mass or less, still further preferably 2 parts by mass or less, even further preferably 1.8 parts by mass or less, per 100 parts by mass of the methacrylic resin because an excessive amount might cause problems such as bleed-out at the time of processing. The amount is preferably 0.01 parts by mass or more from the viewpoint of exerting an effect brought about by the blending.

(Characteristics of Methacrylic Resin Composition)
<Heat Resistance>
A Vicat softening temperature can be used as an index for heat resistance.

The Vicat softening temperature of the methacrylic resin composition of the present embodiment is preferably 113° C. or higher, more preferably 115° C. or higher, from the viewpoint of heat resistance in actual use.

(Method for Producing Methacrylic Resin Composition)
The methacrylic resin composition of the present embodiment can be produced by melt-kneading the methacrylic resin mentioned above, the compound (D) represented by the general formula (1) or (2), and optionally an additional resin which is a resin other than the methacrylic resin, and various additives.

Examples of the method for producing the methacrylic resin composition include kneading methods using a kneading machine such as an extruder, a heat roll, a kneader, a roller mixer, or a Bunbury mixer. Among them, kneading using an extruder is preferred from the viewpoint of productivity.

The kneading temperature can follow preferred processing temperatures of the polymer constituting the methacrylic resin and other resins to be mixed and, as a guideline, is in the range of 140 to 300° C., preferably in the range of 180 to 280° C.

The extruder is preferably provided with a vent for the purpose of decreasing a volatile content.

[Molded Article]
The molded article of the present embodiment is a molded article of the methacrylic resin composition of the present embodiment mentioned above.

The molded article of the present embodiment is suitably used as an optical component such as a light guide panel or a light guide, or a member for vehicles.

The thickness of the molded article of the present embodiment is preferably 0.01 to 10 mm from the viewpoint of excellent handleability and strength, and in the case of using the molded article of the present embodiment as an optical component, also from the viewpoint of excellent optical characteristics, and may be 0.01 to 1 mm. The thickness is more preferably 8 mm or smaller, further preferably 5 mm or smaller, still further preferably 3 mm or smaller, even further preferably 2 mm or smaller, from the viewpoint of suppressing birefringence.

For use as an injection-molded article, the thickness is preferably 0.02 mm or larger, more preferably 0.05 mm or larger.

When the molded article of the present embodiment is a member for vehicles, the thickness of the molded article is preferably 0.03 to 3 mm, more preferably 0.5 to 3 mm, further preferably 0.8 to 2.8 mm, from the viewpoint of weight saving, strength, and molding processability.

(Characteristics of Molded Article)
<Transparency>
Total light transmittance can be used as an index for transparency.

The total light transmittance of the molded article of the present embodiment can be appropriately optimized according to a purpose. In the case of using the molded article of the present embodiment for a purpose required to have transparency, the total light transmittance at a thickness of 2 m is preferably 80% or more from the viewpoint of visibility. The total light transmittance is more preferably 85% or more, further preferably 88% or more, still further preferably 90% or more.

Although higher total light transmittance is more preferred, visibility can be sufficiently secured for practical use even if the total light transmittance is 94% or less.

<Rate of Change in YI Value During Retention>

Usually, resin compositions may be exposed to a high temperature for a long time when treated by the application of heat history, for example, in molding processing. Such heat history might cause yellowing.

Use of the methacrylic resin composition of the present embodiment can reduce the rate of change (δYI) when a YI value obtained by receiving heat history for a short time and a YI value obtained by receiving heat history for a long time are compared.

For example, a test specimen of 3 mm in thickness×20 mm in width×220 mm in length is prepared from a methacrylic resin and a methacrylic resin composition obtained in each of Examples and Comparative Examples mentioned later using an injection molding machine (EC-100SX, manufactured by Toshiba Machine Co., Ltd.) under conditions involving a molding temperature of 280° C. and a mold temperature of 60° C. In this case, the cycle time (injection time+cooling time) of injection molding is set to (c) 45 seconds, which are used in a usual cycle, and (d) 270 seconds, which simulate retention in the molding machine. After stabilization of molding, test specimens from the 11th shot to the 15th shot are used. YI values at a 220 mm long path can be measured as to 5 test specimens obtained for each of the cycle times (c) and (d) and compared to estimate the (δYI).

Specifically, an average YI value of 5 test specimens prepared under the condition (c) and an average YI value of 5 test specimens prepared under the condition (d) are determined, and the rate of change in YI value can be calculated according to the following expression and used as an index for evaluation.

$$\text{Rate of change in } YI \text{ value } (\delta YI) = [\text{Average } YI \text{ value of } (d) - \text{Average } YI \text{ value of } (c)]/\text{Average } YI \text{ value of } (c) \times 100(\%)$$

The rate of change in YI value is preferably 20% or less, more preferably 18% or less, further preferably 15% or less, still further preferably 13% or less, even further preferably 10% or less.

The YI value can be measured in accordance with JIS K 7105 using a colorimeter (manufactured by Tokyo Denshoku Co., Ltd., TC-8600A, light source: 10-C).

<Thickness Dependence of Transmittance>

The transmittance of the molded article of the present embodiment is preferably 40% or less, more preferably 33% or less, further preferably 15% or less, still further preferably 11% or less, in terms of the rate of decay from 3 mm to 220 mm.

<Difference in ΔYI Value Depending on Thickness of Molded Article (Thickness Dependence of Degree of Yellowing (ΔYI))>

ΔYI at thicknesses from 3 mm to 220 mm of the molded article of the present embodiment is preferably 40 or less, more preferably 15 or less, further preferably 5 or less, still further preferably 2 or less.

<Light Resistance>

As for evaluation criteria for light resistance, difference in color (ΔE*) of a sample between before and after an accelerated exposure test for 48 hours in a xenon light resistance tester is preferably 5 or less, more preferably 4 or less, further preferably 3 or less.

As a result, a resin composition excellent in performance of being insusceptible to coloring, change of properties, and deterioration against light from a light source having an emission wavelength distribution from the short-wavelength region of visible light to the ultraviolet region, i.e., light resistance, can be obtained, and the working effects of the present invention can be more sufficiently exerted.

The difference in color, ΔE*, can be measured using a colorimeter according to JIS Z 8730.

For example, the following xenon light resistance tester can be used.

Measurement apparatus: MAX303 (manufactured by Asahi Spectra Co., Ltd.)
Lamp/UV: mirror module UV-VIS
Lamp distance: 100 mm
Radiation intensity: 49.5 mw/cm$^2$
Wavelength: 365 nm
Temperature: room temperature
Sample: sheet thickness of 3 mm <Appearance>

The appearance of the molded article can be evaluated from, for example, the presence or absence of air bubbles, the presence or absence of streaks, or the presence or absence of silver streaks and, specifically, can be evaluated by a method described in Examples mentioned later.

For the molded article of the present embodiment, the number of test specimens on which silver streaks are observed on the surfaces of the test specimens among 50 test specimens obtained by drying the methacrylic resin composition of the present embodiment at 80° C. for 24 hours, followed by molding using an injection molding machine and a mold for measurement is preferably 10 or less, more preferably 5 or less, and even more preferably 2 or less.

The presence or absence of silver streaks on the molded article can be evaluated by a method described in Examples mentioned later.

(Method for Producing Molded Article)

The molded article of the present embodiment can be produced by molding the methacrylic resin composition of the present embodiment.

A method known in the art such as injection molding, sheet forming, blow molding, injection blow molding, inflation molding, T-die molding, press molding, extrusion molding, foam molding, or casting can be applied to the method for producing the molded article. A secondary processing molding method such as pressure molding or vacuum molding may be used.

One example of the method for producing the molded article can include a method of producing the methacrylic resin composition by kneading using a kneading machine such as a heat roll, a kneader, a Bunbury mixer, or an extruder, followed by cooling, pulverization, and further molding by transfer molding, injection molding, compression molding, or the like.

(Purpose of Molded Article)

The methacrylic resin composition of the present embodiment can be suitably used as a material for various molded articles such as optical components and members for vehicles.

Examples of the purpose of the molded article include household goods, OA equipment, AV equipment, members for batteries and electric components, lighting equipment, indicators, vehicle interior panels such as interior panels, installment panels, heater control panels, and door panels, switches such as power window switches, vehicle interior members such as watch covers, meter covers, meter dials, meter needles, covers for head-up displays, prism lenses for head-up displays, and shift lever covers, scuff plates, pillar garnishes, rear license garnishes, rear corner garnishes, front grills, tail lamp covers, fog lamp covers, headlamp covers, slide rail covers, lenses such as headlight non-spherical lenses (PES lenses) and inner lenses for headlights and tail lamps, members for automotive component purposes such as members for vehicle exteriors such as emblems, blade antennas, dolphin antennas, shark fin antennas, light guide rods, visors, and bug guards, members for housing purposes, members for sanitary purposes such as sanitary ware alternatives, and light guide panels for use in displays such as liquid-crystal displays, plasma displays, organic EL displays, field emission displays, and rear projection televisions, diffuser plates, polarizing plate protective films, quarter-wave plates, half-wave plates, viewing angle control films, and phase difference films such as liquid-crystal optical compensation films, display front plates, display base plates, lenses, and touch panels. Also, the methacrylic resin composition of the present embodiment can be suitably used in transparent base plates or the like for use in solar cells.

In addition, the methacrylic resin composition can be used in the fields of optical communication systems, optical switching systems, and optical measurement systems for waveguides, lenses, optical fibers, optical fiber coating materials, LED lenses, lens covers, and the like. Also, the methacrylic resin composition may be used as a modifier for other resins.

EXAMPLES

Hereinafter, the present embodiment will be described with reference to specific Examples and Comparative Examples. However, the present embodiment is not limited by Examples mentioned later.

[Raw Material]

The raw materials used in Examples and Comparative Examples mentioned later will be given below.

(Monomer Constituting Methacrylic Resin)
<(A) Methacrylic Acid Ester Monomer>
(A-1): Methyl methacrylate (MMA)
manufactured by Asahi Kasei Corp. (supplemented with 2.5 ppm of 2,4-dimethyl-6-tert-butylphenol manufactured by Chugai Boeki Co., Ltd. as a polymerization inhibitor)
<(B) Structural Unit Having Ring Structure in Backbone>
(B-1) N-Phenylmaleimide (N-PMI): manufactured by Nippon Shokubai Co., Ltd.
(B-2) N-Cyclohexylmaleimide (N-CMI): synthesized by the following production method.

A flask equipped with a thermometer, a Dean-Stark tube, a dropping funnel, and stirrer was charged with maleic anhydride and o-xylene in an amount of 6 times the unit mass of the maleic anhydride, heated to 55° C., and stirred to prepare a homogenous o-xylene solution of the maleic anhydride.

Subsequently, to this maleic anhydride solution, the whole amount of a solution containing cyclohexylamine in an amount equal to mol of the maleic anhydride, and o-xylene having a mass equal thereto was added dropwise over 30 minutes with stirring at 55° C. to prepare a slurry solution of N-cyclohexylmaleamidic acid in o-xylene.

Next, to the slurry solution, orthophosphoric acid as an acid catalyst having the same mass as that of the cyclohexylamine, and 200 ppm of copper dibutyldithiocarbamate as a polymerization inhibitor with respect to the N-cyclohexylmaleamidic acid were added, and the mixture was heated, kept at 140° C. with stirring, and reacted for 8 hours while water generated by the reaction was distilled off from the reaction system through the Dean-Stark tube.

After the completion of reaction, the acid catalyst layer separated into a lower layer was separated and removed from the reaction solution at 140° C.

Subsequently, the reaction solution was washed twice with an aqueous solution of 3% by mass of sulfuric acid and twice with ion-exchange water. o-Xylene was removed from the organic layer under reduced pressure of 10 mmHg, and the residue was purified by distillation at an internal temperature of 130 to 150° C. under reduced pressure of 5 mmHg to obtain a white raw material composed mainly of N-cyclohexylmaleimide.

(B-3) Glutarimide skeleton
A glutarimide skeleton was introduced by the method of Production Example 6.
<(C) Vinyl Monomer>
(C-1): Styrene (St): manufactured by Asahi Kasei Corp.
(C-2): Methacrylic acid (MAA): manufactured by Tokyo Chemical Industry Co., Ltd.
<(D) Compound>
(D-1) N-Cyclohexyl-2-hydroxysuccinimide Recrystallization and purification were repeated using the first fraction of distillation obtained at the time of production of the component (B-2) to obtain needle-like crystals of the component (D-1).
(Organic Solvent)
m-Xylene: manufactured by Mitsui Chemicals, Inc.
(Others)
n-Octylmercaptan (NOM): manufactured by Arkema Co., Ltd., used as a chain transfer agent.
Perhexa C-75 (EB): manufactured by NOF Corp., purity: 75% (containing 25% ethylbenzene), used as a polymerization initiator.
t-Butyl peroxy-2-ethylhexanoate: manufactured by NOF Corp., used as a polymerization initiator.
Calcium phosphate: manufactured by Nippon Chemical Industries, Co., Ltd., used as a suspending agent.
Calcium carbonate: manufactured by Shiraishi Kogyo Kaisha, Ltd., used as a suspending agent.
Sodium lauryl sulfate: manufactured by Wako Pure Chemical Industries, Ltd., used as a suspension aid.
(Additive)
(a-1) ADK STAB AD2112: manufactured by ADEKA Corp.
(a-2) ADK STAB AO-80: manufactured by ADEKA Corp.
(a-3) Tinuvin P: manufactured by BASF SE
(a-4) Mitsubishi Carbon Black #2600 was surface-coated with zinc stearate. First, a coating agent of 1.5 times the mass of Mitsubishi Carbon Black #2600 was weighed and melted by heating to 160° C., which was above the melting point. Then, a predetermined amount of carbon black was added into the solution and stirred. The melting point of zinc stearate is approximately 140° C. The mixture was thoroughly stirred for dispersion and then cooled to obtain surface-coated carbon black.

Hereinafter, methods for measuring the characteristics of methacrylic resins and methacrylic resin compositions will be described.

(I. Measurement of Weight-Average Molecular Weight of Methacrylic Resin Composition)

The weight-average molecular weights (Mw) of a methacrylic resin produced in each of Production Examples mentioned later, and a methacrylic resin composition produced in each of Examples and Comparative Examples were measured using the following apparatus and conditions.

Measurement apparatus: manufactured by Tosoh Corp., gel permeation chromatography (HLC-8320GPC)
Measurement Conditions:
Column: one TSK guard column SuperH-H, two columns TSKgel SuperHM-M, and one column TSKgel SuperH2500 were connected in series in order for use. This column elutes higher-molecular-weight components earlier and lower-molecular-weight components later.

Developing solvent: tetrahydrofuran, flow rate; 0.6 mL/min, 0.1 g/L 2,6-di-t-butyl-4-methylphenol (BHT) was added as an internal standard.

Detector: RI (differential refractive index) detector
Detection sensitivity: 3.0 mV/min
Column temperature: 40° C.
Sample: a solution containing 0.02 g of methacrylic resin and 20 mL of tetrahydrofuran
Injection volume: 10 μL
Standard sample for calibration curve: the following 10 polymethyl methacrylates (manufactured by Polymer Laboratories Ltd., PMMA Calibration Kit M-M-10) having a known weight peak molecular weight in the monodisperse system and differing in molecular weight were used.

| | Weight peak molecular weight (Mp) |
|---|---|
| Standard sample 1 | 1,916,000 |
| Standard sample 2 | 625,500 |
| Standard sample 3 | 298,900 |
| Standard sample 4 | 138,600 |
| Standard sample 5 | 60,150 |
| Standard sample 6 | 27,600 |
| Standard sample 7 | 10,290 |
| Standard sample 8 | 5,000 |
| Standard sample 9 | 2,810 |
| Standard sample 10 | 850 |

The RI detection intensity was measured for the elution time of the methacrylic resin under the conditions described above.

The weight-average molecular weight (Mw) of the methacrylic resin composition was determined on the basis of the area of the GPC elution curve and a calibration curve of third-order approximation.

(II. Measurement of Composition of Monomer Unit of Polymer, and Amount of Residual Monomer)

<II-1. Measurement of Composition of Monomer Unit

A methacrylic resin obtained by polymerization was subjected to NMR and FT-IR measurement to confirm the composition of monomer units and structural units.

NMR: manufactured by JEOL Ltd., JNM-ECA500
FT-IR: manufactured by JASCO Corp., IR-410, the ATR method (Dura Scope (ATR crystals: diamond/ZnSe), resolution: 4 cm$^{-1}$) was used.

<II-2. Measurement of Amount of Residual Monomer>

Measurement was carried out by the calibration curve method using GC.

(III. Measurement of Physical Properties)

Hereinafter, methods for evaluating methacrylic resins and methacrylic resin compositions will be described.

<III-1. Heat Resistance; Measurement of Vicat Softening Temperature>

Resin pellets obtained in each of Examples and Comparative Examples mentioned later were molded, and the Vicat softening temperature (° C.) of a test specimen of 4 mm in thickness was measured in accordance with ISO 306 B50 and used as an index for heat resistance evaluation.

<III-2. Transparency (Optical Characteristics); Measurement of Total Light Transmittance>

Resin pellets obtained in each of Examples and Comparative Examples mentioned later were molded by injection molding, and the total light transmittance of a test specimen of 3 mm in thickness was measured in accordance with JIS K 7361-1.

Total light transmittance 90% or more, which is equivalent to the level of a general commercially available acrylic resin (PMMA), was evaluated as being preferred.

<III-3. Degree of Change in YI Value (δYI)>

A test specimen of 3 mm in thickness×20 mm in width× 220 mm in length was prepared from a methacrylic resin composition and a methacrylic resin obtained in each of Examples and Comparative Examples mentioned later using an injection molding machine (EC-100SX, manufactured by Toshiba Machine Co., Ltd.) under conditions involving a molding temperature of 280° C. and a mold temperature of 60° C.

The cycle time (injection time+cooling time) of injection molding was set to (c) 45 seconds and (d) 270 seconds.

After stabilization of molding, test specimens from the 11th shot to the 15th shot were used. YI values at a 220 mm long path were measured as to 5 test specimens obtained for each of the cycle times (c) and (d).

An average YI value of 5 test specimens prepared under the condition (c) and an average YI value of 5 test specimens prepared under the condition (d) were determined, and the degree of change in YI value (δYI) at a 220 mm long path was calculated according to [Average YI value of (d)– Average YI value of (c)]/Average YI value of (c)×100(%).

The YI value was measured in accordance with JIS K 7105 using a colorimeter (manufactured by Tokyo Denshoku Co., Ltd., TC-8600A, light source: 10-C).

<Long-Term Retention Evaluation Results>

Evaluation was conducted as "⊚" for a degree of change in YI value, δYI, of 10% or less, "○" for δYI of more than 10% and 13% or less, "Δ" for δYI of 20% or less, and "X" for δYI of more than 20%.

<(III-4) Presence or Absence of Silver Streaks>

A methacrylic resin composition and a methacrylic resin obtained in each of Examples and Comparative Examples mentioned later were dried at 80° C. for 24 hours and then evaluated for the presence or absence of silver streaks using an injection molding machine, a mold for measurement, and molding conditions described below.

Specifically, the resin was injected to a central portion of a mold surface under the conditions given below, and 40 seconds after the completion of injection, a spiral-like molded product was taken out and evaluated for the presence or absence of silver streaks.

After exchange of the resin, 20 shots were abandoned, and 50 samples from the 21st shot to the 70th shot were used to conduct evaluation.

Injection molding machine: EC-100SX (manufactured by Toshiba Machine Co., Ltd.)

Mold for measurement: a mold in which a groove of 2 mm in depth and 12.7 mm in width was dug in from a central portion of the surface in an Archimedean spiral shape Molding Conditions
Resin temperature: 290° C.
Mold temperature: 70° C.
Maximum injection pressure: 75 MPa
Injection time: 20 sec Evaluation of Presence or Absence of Silver Streaks
⊚: silver streaks were observed in 2 or less samples among 50 samples.
○: silver streaks were observed in 5 or less samples among 50 samples.
Δ: silver streaks were observed in 10 or less samples among 50 samples.

X: silver streaks were observed in more than 10 samples among 50 samples.

<(III-5) Evaluation of Mold Release Properties

A methacrylic resin composition and a methacrylic resin obtained in each of Examples and Comparative Examples mentioned later were dried at 80° C. for 24 hours and then evaluated for mold release properties using an injection molding machine, a mold for measurement, and molding conditions described below.

Specifically, after exchange of the resin, 15 shots were abandoned, and 30 samples from the 16th shot to the 45th shot were used to conduct evaluation.

Injection molding machine: EC-100SX (manufactured by Toshiba Machine Co., Ltd.)

Mold for measurement: a long-path test specimen mold of 3 mm in thickness×20 mm in width×220 mm in length Resin temperature: 280° C.

Mold temperature: 70° C.

Evaluation of Mold Release Properties

◎: poor mold release was observed in 1 or less sample among 30 samples.

○: poor mold release was observed in 3 or less samples among 30 samples.

Δ: poor mold release was observed in 7 or less samples among 30 samples.

X: poor mold release was observed in more than 7 samples among 30 samples.

<(III-6) Evaluation of Weather Resistance (Moist Heat Resistance) and Measurement of Weather Resistance (Difference in Color (ΔE*))>

Difference in color (ΔE*) of a sample between before and after an exposure test was measured as an index for weather resistance evaluation.

The test specimen of 3 mm in thickness obtained by molding in the section (III-5) was used to conduct an exposure test using the approach of JIS K 7350-4.

The exposure conditions involved a black panel temperature set to 63±3° C., a water spraying time set to (18±0.5) minutes, a stop time of spraying set to (102±0.5) minutes, and a total exposure time of 2040 hours.

The test specimen was set such that the 20 mm×220 mm face of the test specimen of 3 mm in thickness was an exposure face.

The test specimen thus exposed was washed with water. Then, the color of the object was measured.

A value of ΔE* was used as the difference in color. This value was measured according to JIS Z 8730 using a colorimeter as to the exposure face of the sample for evaluation in a flat sheet shape. Specifically, the difference in color, ΔE*, of transmitted light was measured in the thickness direction from the exposure face.

ΔE* of less than 3 after exposure for 2040 hours was evaluated as being preferred.

<Weather Resistance Evaluation>

The evaluation was conducted as "◎" for ΔE* of 2 or less, "○" for ΔE* of more than 2 and less than 2.5, "Δ" for ΔE* of 2.5 or more and less than 3, and "X" for ΔE* of "3" or more.

<(III-7) Evaluation of Light Resistance (Xenon Lamp)

A flat sheet of 100 mm×100 mm×3 mm was formed from a methacrylic resin composition and a methacrylic resin obtained in each of Examples and Comparative Examples mentioned later, and evaluated for light resistance using an apparatus described below.

Difference in color (ΔE*) of a sample between before and after an exposure test for 48 hours was measured as light resistance evaluation criteria.

A value of ΔE* was used as the difference in color. This value was measured according to JIS Z 8730 using a colorimeter as to the exposure face of the sample for evaluation in a flat sheet shape. Specifically, the difference in color, ΔE*, of transmitted light was measured in the thickness direction from the exposure face.

Measurement apparatus: MAX303 (manufactured by Asahi Spectra Co., Ltd.)

Lamp/UV: mirror module UV-VIS

Lamp distance: 100 mm

Radiation intensity: 49.5 mw/cm$^2$

Wavelength: 365 nm

Temperature: room temperature

Sample: sheet thickness of 3 mm

<Light Resistance Evaluation>

The evaluation was conducted as "◎" for ΔE* of 3 or less, "○" for ΔE* of more than 3 and 4 or less, "Δ" for ΔE* of more than 4 and 5 or less, and "X" for ΔE* of more than 5.

<IV. Overall Evaluation>

In the evaluations described above, a sample confirmed to be most suitable for optical component purposes and vehicle installation member purposes with weather resistance and a particularly small degree of change in difference in YI (ΔYI) between long-term retention molding and usual molding was given "5"; a sample confirmed to be suitable for optical component purposes and vehicle installation member purposes was given "4"; a sample confirmed to be suitable for purposes that are not concerned about change in color during retention by heating was given "3"; a sample confirmed to be suitable for purposes, such as vehicle interior purposes, which do not emphasize weather resistance was given "2"; and a sample confirmed to be unsuitable for vehicle installation purposes and optical component purposes duet to failure in any of the items was given "1".

Hereinafter, Production Examples of methacrylic resins will be described.

Production Example 1

A container having a stirrer equipped with a four-blade pitched paddle impeller was charged with 2 kg of water, 65 g of calcium phosphate, 39 g of calcium carbonate, and 0.39 g of sodium lauryl sulfate to obtain a mixed solution (a).

Next, a 60 L reactor having a stirrer equipped with a three-blade Pfaudler impeller was charged with 26 kg of water, heated to 75° C., charged with the mixed solution (a), and subsequently charged with 22 kg of a monomer mixed solution of 95 parts by mass of methyl methacrylate (A-1), 5 parts by mass of cyclohexylmaleimide (B-2), 0.295 parts by mass of a chain transfer agent n-octylmercaptan, and 0.25 parts by mass of a polymerization initiator t-butyl peroxy-2-ethylhexanoate mixed in advance.

While approximately 75° C. was kept, suspension polymerization was performed. Approximately 120 minutes after charging with the raw material mixture, an exothermic peak was observed. Then, the temperature was raised to 97° C. at a rate of 1° C./min. Then, aging was performed for 120 minutes to substantially terminate the polymerization reaction.

Next, the reactor was cooled to 50° C. and charged with 20% by mass of sulfuric acid in order to dissolve the suspending agent.

Next, the polymerization reaction solution was sifted through a sieve of 1.68 mm mesh to remove aggregated matter. Then, water was filtered off, and the obtained slurry was dehydrated to obtain polymer beads.

The obtained polymer beads were repetitively washed by water washing, then dehydration in the same way as above, further washing with ion-exchange water, and dehydration to obtain polymer particles. The average particle size was 0.29 mm.

The obtained polymer particles were placed in a three-vent φ37 mm extruder set to a cylinder temperature of 270° C. at a portion close to a die, a kneading portion cylinder temperature of 260° C., and 230° C. from resin charge to kneading portions, and subjected to devolatilization treatment at 200 rpm at 12 kg/hr (based on the amount of the resin) while purified water was added in an amount of 4% by mass of the amount of the resin between the resin charge portion and the kneading portion, to obtain resin pellets.

Production Example 2

A container having a stirrer equipped with a four-blade pitched paddle impeller was charged with 2 kg of water, 65 g of calcium phosphate, 39 g of calcium carbonate, and 0.39 g of sodium lauryl sulfate to obtain a mixed solution (a).

Next, a 60 L reactor having a stirrer equipped with a three-blade Pfaudler impeller was charged with 26 kg of water, heated to 75° C., charged with the mixed solution (a), and subsequently charged with 22 kg of a monomer mixed solution of 90 parts by mass of methyl methacrylate (A-1), 5 parts by mass of cyclohexylmaleimide (B-2), 5 parts by mass of styrene, 0.24 parts by mass of a chain transfer agent n-octylmercaptan, and 0.20 parts by mass of a polymerization initiator t-butyl peroxy-2-ethylhexanoate mixed in advance.

While approximately 75° C. was kept, suspension polymerization was performed. Approximately 120 minutes after charging with the raw material mixture, an exothermic peak was observed.

Then, the temperature was raised to 93° C. at a rate of 1° C./min. Then, aging was performed for 120 minutes to substantially terminate the polymerization reaction.

Next, the reactor was cooled to 50° C. and charged with 20% by mass of sulfuric acid in order to dissolve the suspending agent.

Next, the polymerization reaction solution was sifted through a sieve of 1.68 mm mesh to remove aggregated matter. Then, water was filtered off, and the obtained slurry was dehydrated to obtain polymer beads. The obtained polymer beads were repetitively washed by water washing, then dehydration in the same way as above, further washing with ion-exchange water, and dehydration to obtain polymer particles.

The obtained polymer particles were placed in a three-vent φ37 mm extruder set to a cylinder temperature of 270° C. at a portion close to a die, a kneading portion cylinder temperature of 260° C., and 230° C. from resin charge to kneading portions, and subjected to devolatilization treatment at 200 rpm at 12 kg/hr (based on the amount of the resin) while purified water was added in an amount of 4% by mass of the amount of the resin between the resin charge portion and the kneading portion, to obtain resin pellets.

Production Example 3

A container having a stirrer equipped with a four-blade pitched paddle impeller was charged with 2 kg of water, 65 g of calcium phosphate, 39 g of calcium carbonate, and 0.39 g of sodium lauryl sulfate to obtain a mixed solution (a).

Next, a 60 L reactor having a stirrer equipped with a three-blade Pfaudler impeller was charged with 26 kg of water, heated to 75° C., charged with the mixed solution (a), and subsequently charged with 22 kg of a monomer mixed solution of 89 parts by mass of methyl methacrylate (A-1), 11 parts by mass of cyclohexylmaleimide (B-2), 5 parts by mass of m-xylene, 0.208 parts by mass of a chain transfer agent n-octylmercaptan, and 0.25 parts by mass of a polymerization initiator t-butyl peroxy-2-ethylhexanoate mixed in advance.

While approximately 75° C. was kept, suspension polymerization was performed. Approximately 120 minutes after charging with the raw material mixture, an exothermic peak was observed.

Then, the temperature was raised to 93° C. at a rate of 1° C./min. Then, aging was performed for 120 minutes to substantially terminate the polymerization reaction.

Next, the reactor was cooled to 50° C. and charged with 20% by mass of sulfuric acid in order to dissolve the suspending agent.

Next, the polymerization reaction solution was sifted through a sieve of 1.68 mm mesh to remove aggregated matter. Then, water was filtered off, and the obtained slurry was dehydrated to obtain polymer beads. The obtained polymer beads were repetitively washed by water washing, then dehydration in the same way as above, further washing with ion-exchange water, and dehydration to obtain polymer particles. The average particle size was 0.29 mm.

The obtained polymer particles were placed in a three-vent φ37 mm extruder set to a cylinder temperature of 270° C. at a portion close to a die, a kneading portion cylinder temperature of 260° C., and 230° C. from resin charge to kneading portions, and subjected to devolatilization treatment at 200 rpm at 12 kg/hr (based on the amount of the resin) while purified water was added in an amount of 4% by mass of the amount of the resin between the resin charge portion and the kneading portion, to obtain resin pellets.

The weight-average molecular weight of the obtained pellets was 130,000, and the composition determined by NMR was MMA unit: 90% by mass, and CMI unit: 10% by mass.

[Production Example 4] Production Example Based on Solution Polymerization

A 1.25 m³ reaction tank equipped with a stirring apparatus equipped with a paddle impeller, a temperature sensor, a condenser tube, and a nitrogen introduction tube was charged with 470 kg of methyl methacrylate (A-1), 39 kg of N-phenylmaleimide (B-1), 41 kg of N-cyclohexylmaleimide (B-2), 450.0 kg of m-xylene, and 1200 ppm by mass of n-octylmercaptan per 100 parts by mass in total of all the monomers, which were then dissolved to prepare a raw material solution. This raw material solution was heated to 125° C. with stirring while passed through nitrogen.

Aside from this, 0.23 kg of Perhexa C-75 and 1.82 kg of m-xylene were mixed to prepare a polymerization initiator feed solution.

When the raw material solution reached 127° C., the feeding (addition) of the polymerization initiator feed solution (polymerization initiator mixed solution) was started according to profiles (1) to (6).
(1) 0.0 to 0.5 hours: feed rate of 1.00 kg/hr
(2) 0.5 to 1.0 hours: feed rate of 0.50 kg/hr
(3) 1.0 to 2.0 hours: feed rate of 0.41 kg/hr
(4) 2.0 to 3.0 hours: feed rate of 0.36 kg/hr
(5) 3.0 to 4.0 hours: feed rate of 0.14 kg/hr
(6) 4.0 to 7.0 hours: feed rate of 0.13 kg/hr The polymerization initiator was fed over a total of 7 hours (B hr=7 hr). Then, the reaction was further continued for 2 hours. The polymerization reaction was performed for 8 hours after the start of addition of the polymerization initiator.

The internal temperature in the polymerization reaction was controlled to 127±2° C. The rate of polymerization conversion of the obtained polymerization solution was measured and consequently was MMA unit: 94.1% by mass, PMI unit: 95.5% by mass, and CMI unit: 93.2% by mass. Overall, the rate of polymerization conversion was 93%.

This polymerization solution was supplied to a concentration apparatus composed of a tube-type heat exchanger preheated to 170° C. and a vaporization vessel to elevate the concentration of the polymer contained in the solution to 70% by mass.

The obtained polymerization solution was supplied to a thin-film evaporator having a heat transfer area of 0.2 m² to perform devolatilization. This operation was carried out under conditions involving an intra-apparatus temperature of 275° C., a supply amount of 25 L/hr, the number of revolutions of 300 rpm, and a degree of vacuum of 25 Torr. The polymer thus devolatilized was extruded from a strand die by pressure rising using a gear pump, cooled in water, and cut to obtain resin pellets.

The weight-average molecular weight of the obtained pellets was 120,000, and the composition determined by NMR was MMA unit: 86% by mass, PMI unit: 7% by mass, and CMI unit: 7% by mass.

Production Example 5

A container having a stirrer equipped with a four-blade pitched paddle impeller was charged with 2 kg of water, 65 g of calcium phosphate, 39 g of calcium carbonate, and 0.39 g of sodium lauryl sulfate to obtain a mixed solution (a).

Next, a 60 L reactor having a stirrer equipped with a three-blade Pfaudler impeller was charged with 26 kg of water, heated to 75° C., charged with the mixed solution (a), and subsequently charged with 22 kg of a monomer mixed solution of 95 parts by mass of methyl methacrylate (A-1), 5 parts by mass of cyclohexylmaleimide (B-2), 0.389 parts by mass of a chain transfer agent n-octylmercaptan, and 0.25 parts by mass of a polymerization initiator t-butyl peroxy-2-ethylhexanoate mixed in advance.

While approximately 75° C. was kept, suspension polymerization was performed. Approximately 120 minutes after charging with the raw material mixture, an exothermic peak was observed.

Then, the temperature was raised to 97° C. at a rate of 1° C./min. Then, aging was performed for 120 minutes to substantially terminate the polymerization reaction.

Next, the reactor was cooled to 50° C. and charged with 20% by mass of sulfuric acid in order to dissolve the suspending agent.

Next, the polymerization reaction solution was sifted through a sieve of 1.68 mm mesh to remove aggregated matter. Then, water was filtered off, and the obtained slurry was dehydrated to obtain polymer beads. The obtained polymer beads were repetitively washed by water washing, then dehydration in the same way as above, further washing with ion-exchange water, and dehydration to obtain polymer particles. The average particle size was 0.29 mm.

The obtained polymer particles were placed in a three-vent φ37 mm extruder set to a cylinder temperature of 250° C. at a portion close to a die, a kneading portion cylinder temperature of 240° C., and 220° C. from resin charge to kneading portions, and subjected to devolatilization treatment at 200 rpm at 10 kg/hr (based on the amount of the resin) while purified water was added in an amount of 3% by mass of the amount of the resin between the resin charge portion and the kneading portion, to obtain resin pellets. The weight-average molecular weight Mw of the obtained resin was 60,000.

Production Example 6

A 200 L reaction tank equipped with a stirring apparatus equipped with a paddle impeller, a temperature sensor, a condenser tube, and a nitrogen introduction tube was charged with 69.1 kg of methyl methacrylate (MMA), 5.32 kg of styrene (St), 9.57 kg of methacrylic acid (MAA), 56.0 kg of m-xylene, and 0.105 kg of n-octylmercaptan to prepare a raw material solution. This raw material solution was heated to 117° C. with stirring while passed through nitrogen.

Aside from this, 0.029 kg of Perhexa 25B and 0.10 kg of m-xylene were mixed to prepare polymerization initiator feed solution A. Also, 0.0098 kg of Perhexa 25B and 0.10 kg of m-xylene were mixed to prepare polymerization initiator feed solution B.

When the raw material solution reached 117° C., the polymerization initiator feed solution A was fed for 10 minutes at a feed rate of 0.774 kg/hr, and reacted for 2 hours. Then, the polymerization initiator feed solution B was fed for 10 minutes at a feed rate of 0.110 kg/hr. The reaction was further continued for 10 hours. The polymerization reaction was carried out for a total of 12 hours and 20 minutes to complete the reaction.

The obtained polymerization solution was supplied to a high-temperature vacuum chamber set to 280° C., where unreacted products and the solvent were removed and a 6-membered ring acid anhydride was formed.

The composition of the copolymer thus formed was analyzed by NMR and consequently was MMA unit: 78% by mass, St unit: 7% by mass, MAA unit: 3% by mass, and 6-membered ring acid anhydride unit: 12% by mass.

An autoclave having an internal capacity of 5 L was charged with 0.5 kg of copolymer pellets thus obtained, and subsequently charged with 3.0 kg of N,N-dimethylformamide. The mixture was dissolved by stirring. Next, 28% ammonia water containing 2 equivalents of ammonia with respect to the amount of the 6-membered ring acid anhydride unit was added thereto and reacted at 150° C. for 2 hours.

The reaction solution was extracted and added into n-hexane to precipitate the polymer. This polymer was further treated at 250° C. for 2 hours in a 10 Torr volatilization furnace.

The finally obtained copolymer was slightly yellow and transparent, and the composition from nitrogen content quantification by elemental analysis, NMR, and IR was MMA unit: 78% by mass, St unit: 7% by mass, MAA unit: 3% by mass, and glutarimide structural unit: 12% by mass. The operation described above was repeated to obtain resin pellets necessary for evaluation.

Production Example 7

100 parts by mass of the resin pellets obtained in [Production Example 4] mentioned above were blended with 0.04 parts by mass of (D-1), 0.03 parts by mass of (a-3) Tinuvin P, 0.05 parts by mass of (a-1) ADK STAB AD2112, 0.1 parts by mass of (a-2) ADK STAB AO-80, 0.15 parts by mass of Macrolex Violet 3R (manufactured by LANXESS AG), 0.04 parts by mass of Diaresin Yellow H2G (manufactured by Mitsubishi Chemical Corp.), 0.3 parts by mass of Macrolex Green 5B (manufactured by LANXESS AG), 0.06 parts by mass of Diaresin Blue L (manufactured by Mitsubishi Chemical Corp.), and 0.15 parts by mass of carbon black (a-4) by hand blending. The blend was melt-kneaded using a vented (three locations) ϕ26 mm twin-screw extruder TEM-26SS (L/D=48, four-hole die used, die set temperature: 250° C., barrel set temperature: 250° C., outlet side, hopper-adjacent barrel set temperature: 220° C.) manufactured by Toshiba Machine Co., Ltd. under conditions involving a discharge rate of 12 kg/hr, a water bath temperature of 60° C. (water contact distance: approximately 20 cm), and the number of revolutions of 180 rpm to produce a methacrylic resin composition in the form of pellets.

Example 1

100 parts by mass of the resin pellets obtained in [Production Example 1] mentioned above were blended with 0.04 parts by mass of (D-1), 0.03 parts by mass of (a-3) Tinuvin P, 0.05 parts by mass of (a-1) ADK STAB AD2112, and 0.1 parts by mass of (a-2) ADK STAB AO-80 by hand blending. The blend was melt-kneaded using a vented (three locations) ϕ26 mm twin-screw extruder TEM-26SS (L/D=48, four-hole die used, die set temperature: 250° C., barrel set temperature: 250° C., outlet side, hopper-adjacent barrel set temperature: 220° C.) manufactured by Toshiba Machine Co., Ltd. under conditions involving a discharge rate of 12 kg/hr, a water bath temperature of 60° C. (water contact distance: approximately 20 cm), and the number of revolutions of 180 rpm to produce a methacrylic resin composition in the form of pellets.

The weight-average molecular weight of the methacrylic resin in the obtained methacrylic resin composition was 100,000.

The amount of residual methyl methacrylate was 1200 ppm, and the amount of residual N-cyclohexylmaleimide was 600 ppm.

The obtained methacrylic resin composition pellets were used to evaluate physical properties as described above.

A test specimen of 4 mm in thickness was prepared using the methacrylic resin composition pellets obtained in Example 1. The Charpy impact strength (without notches) of the test specimen of 4 mm in thickness was measured in accordance with ISO179/1eU and consequently was 16 kJ/m$^2$.

[Examples 2 to 10] and [Comparative Examples 1 to 3]

Methacrylic resin compositions were produced in the same way as the method of Example 1 using the resins described in Table 1, and evaluated.

The evaluation results are shown in Table 1.

TABLE 1

|  |  | /parts by mass | Example 1 Production Example 1 100 | Example 2 Production Example 1 100 | Example 3 Production Example 1 100 | Example 4 Production Example 2 100 | Example 5 Production Example 3 100 | Example 6 Production Example 1 100 | Example 7 Production Example 6 100 |
|---|---|---|---|---|---|---|---|---|---|
|  | Resin |  |  |  |  |  |  |  |  |
| Blending | (A-1) Methyl methacrylate (MMA) | /parts by mass | 95 | 95 | 95 | 90 | 90 | 95 | 78 |
|  | (B-1) N-Phenylmaleimide (PMI) | /parts by mass |  |  |  |  |  |  |  |
|  | (B-2) N-Cyclohexylmaleimide (CMI) | /parts by mass | 5 | 5 | 5 | 5 | 10 | 5 |  |
|  | (B-3) Glutarimide skeleton | /parts by mass |  |  |  |  |  |  | 12 |
|  | (C-1) Styrene (St) | /parts by mass |  |  |  | 5 |  |  | 7 |
|  | (C-2) Methacrylic acid (MAA) | /parts by mass |  |  |  |  |  |  | 3 |
|  | (D-1) N-Cyclohexyl-2-hydroxysuccinimide | /parts by mass | 0.04 | 0.01 | 0.005 | 0.01 | 0.11 | 0.19 | 0.05 |
|  | (B)/(D-1) |  | 125 | 500 | 1000 | 500 | 91 | 26 | 240 |
| Evaluation | (I) Weight-average molecular weight of methacrylic resin composition | thousand | 100 | 100 | 100 | 110 | 130 | 100 | 130 |
|  | (III-1) Vicat softening temperature | ° C. | 116 | 116 | 116 | 115 | 120 | 116 | 120 |
|  | (III-2) Total light transmittance | % | 91 | 91 | 91 | 90 | 91 | 91 | 90 |
|  | (III-3) Degree of change in YI value between 45-sec molding and 270-sec molding at 220 mm long path | % | 7.1 | 12.6 | 18.4 | 14.1 | 8.8 | 11.3 | 13.0 |
|  | (III-3) Long-term retention evaluation results |  | ⊚ | ○ | Δ | ○ | ⊚ | ○ | ○ |
|  | (III-4) Molding processability (presence or absence of silver streaks) |  | ⊚ | ⊚ | ⊚ | ○ | ⊚ | ○ | ○ |
|  | (III-5) Evaluation of mold release properties |  | ⊚ | ○ | ○ | ○ | ⊚ | ○ | ⊚ |

TABLE 1-continued

| | | | | | | | | |
|---|---|---|---|---|---|---|---|---|
| | (III-6) Weather resistance (change in color ΔE*) | | 1.9 | 1.8 | 1.8 | 1.8 | 2 | 2.5 | 2.4 |
| | (III-6) Weather resistance evaluation results | | ◎ | ◎ | ◎ | ◎ | ◎ | Δ | ○ |
| | (III-7) Light resistance evaluation (change in color ΔE*) | | 2.1 | 2.8 | 3.8 | 3.2 | 2.9 | 4.9 | — |
| | (III-7) Light resistance evaluation results | | ◎ | ◎ | ○ | ○ | ◎ | Δ | — |
| | (IV) Overall evaluation | | 5 | 4 | 3 | 4 | 5 | 2 | 4 |

| | | | Example 8 Production Example 3 100 | Example 9 Production Example 4 100 | Example 10 Production Example 7 100 | Comparative Example 1 Production Example 1 100 | Comparative Example 2 Production Example 6 100 | Comparative Example 3 Production Example 5 100 |
|---|---|---|---|---|---|---|---|---|
| Blending | (A-1) Methyl methacrylate (MMA) | /parts by mass | 90 | 86 | — | 95 | 78 | 95 |
| | (B-1) N-Phenylmaleimide (PMI) | /parts by mass | | 7 | — | | | |
| | (B-2) N-Cyclohexylmaleimide (CMI) | /parts by mass | 10 | 7 | — | 5 | | 5 |
| | (B-3) Glutarimide skeleton | /parts by mass | | | — | | 12 | |
| | (C-1) Styrene (St) | /parts by mass | | | — | | 7 | |
| | (C-2) Methacrylic acid (MAA) | /parts by mass | | | — | | 3 | |
| | (D-1) N-Cyclohexyl-2-hydroxysuccinimide | /parts by mass | 0.015 | 0.07 | — | 0.25 | 0 | 0.02 |
| | (B)/(D-1) | | 667 | 100 | — | 20 | — | 250 |
| Evaluation | (I) Weight-average molecular weight of methacrylic resin composition | thousand | 130 | 120 | 120 | 100 | 130 | 60 |
| | (III-1) Vicat softening temperature | °C. | 120 | 123 | 123 | 116 | 120 | 115 |
| | (III-2) Total light transmittance | % | 91 | 91 | 0 | 91 | 90 | 91 |
| | (III-3) Degree of change in VI value between 45-sec molding and 270-sec molding at 220 mm long path | % | 17.1 | 9.2 | — | 21.4 | 23.2 | 23.8 |
| | (III-3) Long-term retention evaluation results | | Δ | ◎ | — | × | × | × |
| | (III-4) Molding processability (presence or absence of silver streaks) | | ○ | ○ | ○ | Δ | ○ | × |
| | (III-5) Evaluation of mold release properties | | ○ | ◎ | ◎ | × | ○ | Δ |
| | (III-6) Weather resistance (change in color ΔE*) | | 2 | 2 | 1.5 | 3.3 | 2.9 | 2.2 |
| | (III-6) Weather resistance evaluation results | | ◎ | ◎ | ◎ | × | Δ | ○ |
| | (III-7) Light resistance evaluation (change in color ΔE*) | | 3.2 | 2.8 | 2.2 | 5.6 | — | 3.8 |
| | (III-7) Light resistance evaluation results | | ○ | ◎ | ◎ | × | — | ○ |
| | (IV) Overall evaluation | | 3 | 4 | 5 | 1 | 1 | 1 |

As shown in Table 1, the resin composition having the weight-average molecular weight of the methacrylic resin within the predetermined range, the content of the component (D) within the predetermined range, and the mass ratio (B)/(D) within the predetermined range was found to have practically sufficient optical characteristics and be excellent in heat resistance, thermal stability, appearance, weather resistance, and molding processability.

The present application is based on Japanese Patent Application No. 2018-096368 filed in the Japan Patent Office on May 18, 2018, the contents of which are incorporated herein by reference.

INDUSTRIAL APPLICABILITY

The methacrylic resin composition of the present invention, and the molded article comprising the same have industrial applicability as materials for household goods, OA equipment, AV equipment, members for batteries and electric components, lighting equipment, indicators, vehicle interior panels such as interior panels, installment panels, heater control panels, and door panels, switches such as power window switches, vehicle interior members such as watch covers, meter covers, meter dials, meter needles, covers for head-up displays, prism lenses for head-up displays, and shift lever covers, scuff plates, pillar garnishes, rear license garnishes, rear corner garnishes, front grills, tail lamp covers, fog lamp covers, headlamp covers, slide rail covers, lenses such as headlight non-spherical lenses (PES lenses) and inner lenses for headlights and tail lamps, members for automotive component purposes such as members for vehicle exteriors such as emblems, blade antennas, dolphin antennas, shark fin antennas, light guide rods, visors, and bug guards, members for housing purposes, members for sanitary purposes such as sanitary ware alternatives, and light guide panels for use in displays such as liquid-crystal displays, plasma displays, organic EL displays, field emission displays, and rear projection televisions, diffuser plates, polarizing plate protective films, quarter-wave plates, half-wave plates, viewing angle control films, and phase difference films such as liquid-crystal optical compensation films, transparent base plates for display front plates, display base plates, lenses, touch panels, etc., decorative films, and transparent base plates for use in solar cells, and in the fields of optical communication systems, optical switching systems, and optical measurement systems, members such as waveguides, lenses, optical fibers, optical fiber coating materials, LED lenses, and lens covers.

The invention claimed is:

1. A methacrylic resin composition comprising
100 parts by mass of a methacrylic resin comprising 50 to 97% by mass of a methacrylic acid ester monomer unit (A), 3 to 30% by mass of a structural unit (B) having a ring structure in the backbone, and 0 to 20% by mass of an additional vinyl monomer unit (C) copolymerizable with a methacrylic acid ester monomer, and
0.001 to 0.2 parts by mass of a compound (D) represented by the following general formula (1),
the methacrylic resin composition satisfying the following conditions (I) and (II):
(I): a weight-average molecular weight of the methacrylic resin composition as measured by gel permeation chromatography (GPC) is 65,000 to 300,000, and
(II): a mass ratio between the component (D) and the structural unit (B) having a ring structure in the backbone is 25≤(B)/(D)≤1000

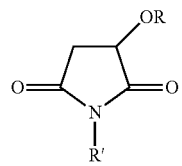

(1)

wherein R represents a hydrogen atom, an aliphatic hydrocarbon group having 1 to 12 carbon atoms or an aromatic hydrocarbon group, wherein each carbon atom optionally has a sulfur atom, a nitrogen atom, an oxygen atom, or a phosphorus atom, and
R' represents an aliphatic hydrocarbon group having 1 to 12 carbon atoms or an aromatic hydrocarbon group having 6 to 18 carbon atoms, wherein each carbon atom optionally has a sulfur atom, a nitrogen atom, an oxygen atom, or a phosphorus atom.

2. The methacrylic resin composition according to claim 1, wherein
the component (B) comprises at least one structural unit selected from the group consisting of a maleimide structural unit (B-1), a glutaric anhydride structural unit (B-2), a glutarimide structural unit (B-3), a lactone ring structural unit (B-4), and an acid anhydride structural unit (B-5).

3. A molded article of a methacrylic resin composition according to claim 1.

4. The molded article according to claim 3, wherein the molded article is an optical component.

5. The molded article according to claim 3, wherein the molded article is a member for vehicles.

6. The molded article according to claim 5, wherein a thickness is 0.03 to 3 mm.

7. The methacrylic resin composition according to claim 1, wherein R represents a hydrogen atom in the general formula (1).

8. The methacrylic resin composition according to claim 1, which contains said additional vinyl monomer unit (C) copolymerizable with a methacrylic acid ester monomer.

9. The methacrylic resin composition according to claim 8, wherein said additional vinyl monomer unit (C) copolymerizable with a methacrylic acid ester monomer comprises an acrylic acid ester monomer unit (C-1).

10. The methacrylic resin composition according to claim 9, wherein said additional vinyl monomer unit (C) copolymerizable with a methacrylic acid ester monomer comprises an acrylic acid ester monomer unit represented by the general formula (ix)

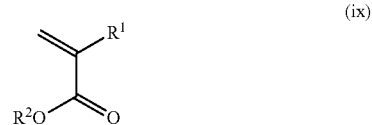

(ix)

wherein $R^1$ represents a hydrogen atom or an alkoxy group having 1 to 12 carbon atoms, and $R^2$ represents an alkyl group having 1 to 18 carbon atoms, a cycloalkyl group having 1 to 18 carbon atoms, or an aryl group having 1 to 18 carbon atoms.

11. The methacrylic resin composition according to claim 8, wherein said additional vinyl monomer unit (C) copolymerizable with a methacrylic acid ester monomer comprises a vinyl cyanide monomer unit (C-2).

12. The methacrylic resin composition according to claim 11, wherein said additional vinyl monomer unit (C) copolymerizable with a methacrylic acid ester monomer comprises one or more of a vinyl cyanide monomer unit (C-2) selected from the group consisting of acrylonitrile, methacrylonitrile, and vinylidene cyanide.

* * * * *